US008352743B2

(12) United States Patent
Tsuruoka et al.

(10) Patent No.: US 8,352,743 B2
(45) Date of Patent: Jan. 8, 2013

(54) CLIENT DEVICE, KEY DEVICE, SERVICE PROVIDING APPARATUS, USER AUTHENTICATION SYSTEM, USER AUTHENTICATION METHOD, PROGRAM, AND RECORDING MEDIUM

(75) Inventors: Yukio Tsuruoka, Tokyo (JP); Shingo Orihara, Tokyo (JP); Kei Karasawa, Tokyo (JP); Kenji Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 727 days.

(21) Appl. No.: 12/523,537

(22) PCT Filed: Feb. 7, 2008

(86) PCT No.: PCT/JP2008/052055
§ 371 (c)(1),
(2), (4) Date: Jul. 28, 2009

(87) PCT Pub. No.: WO2008/099756
PCT Pub. Date: Aug. 21, 2008

(65) Prior Publication Data
US 2010/0088519 A1    Apr. 8, 2010

(30) Foreign Application Priority Data
Feb. 7, 2007 (JP) ................................ 2007-028500

(51) Int. Cl.
*H04L 9/32* (2006.01)
(52) U.S. Cl. ....................................... 713/176; 380/277
(58) Field of Classification Search .................. None
See application file for complete search history.

(56) References Cited

U.S. PATENT DOCUMENTS

2003/0200447 A1 * 10/2003 Sjoblom ........................ 713/186
2004/0230800 A1   11/2004 Futa et al.
(Continued)

FOREIGN PATENT DOCUMENTS
AU      2004254771 B2     1/2005
(Continued)

OTHER PUBLICATIONS

Office Action issued Aug. 30, 2011, in Japanese Patent Application No. 2008-558066 with English translation.

*Primary Examiner* — Eleni Shiferaw
*Assistant Examiner* — Abu Sholeman
(74) *Attorney, Agent, or Firm* — Oblon, Spivak, McClelland, Maier & Neustadt, L.L.P.

(57) ABSTRACT

At user registration, a client device obtains a signature for a user ID, a password, and a public key by using a private key, and sends user information that includes the signature and the above-described information items to a service providing apparatus. The service providing apparatus verifies the signature by using the public key and stores the user information by which the password and the public key are associated with each other. When a request for a service is made, the client device allows authentication processing by sending to the service providing apparatus an authentication response that includes the user ID together with password authentication information, a signature for a challenge sent from the service providing apparatus, or a signature for the password and the challenge, irrespective of whether the authentication method for the service is password authentication, public key authentication, or public-key-and-password combination authentication.

23 Claims, 20 Drawing Sheets

U.S. PATENT DOCUMENTS

| | | | |
|---|---|---|---|
| 2006/0174323 A1* | 8/2006 | Brown et al. | 726/3 |
| 2006/0271781 A1 | 11/2006 | Murakawa | |
| 2007/0081667 A1* | 4/2007 | Hwang | 380/30 |
| 2007/0118883 A1* | 5/2007 | Potter et al. | 726/4 |
| 2007/0220274 A1* | 9/2007 | Jensen et al. | 713/186 |
| 2007/0234039 A1* | 10/2007 | Aull | 713/155 |
| 2007/0274422 A1* | 11/2007 | Shivaji-Rao et al. | 375/354 |
| 2008/0082449 A1* | 4/2008 | Wilkinson et al. | 705/59 |
| 2010/0049975 A1* | 2/2010 | Parno et al. | 713/168 |
| 2011/0296167 A1* | 12/2011 | Adusumilli et al. | 713/152 |

FOREIGN PATENT DOCUMENTS

| | | |
|---|---|---|
| JP | 2002 132727 | 5/2002 |
| JP | 2004 21686 | 1/2004 |
| JP | 2004 334860 | 11/2004 |
| JP | 2004 348308 | 12/2004 |
| JP | 2006 251868 | 9/2006 |
| JP | 2006 302210 | 11/2006 |
| JP | 2006 331120 | 12/2006 |
| WO | WO 98/07255 | 2/1998 |

* cited by examiner

| SERVER CERTIFICATE | USER ID | PUBLIC KEY | PRIVATE KEY |
|---|---|---|---|
| CERTIFICATE 1 | 1001 | 48572096872 | 5353453656 |
| CERTIFICATE 2 | 2002 | 63560398634 | 7767547375 |
| ⋮ | ⋮ | ⋮ | ⋮ |

| USER ID | PASSWORD | PUBLIC KEY | USER ATTRIBUTE |
|---|---|---|---|
| 1001 | abcdef | 48572096872 | IP ADDRESS 1, ADDRESS 1, CARD NUMBER 1 |
| 1002 | defghi | 87039834096 | IP ADDRESS 2, ADDRESS 2, CARD NUMBER 2 |
| ⋮ | ⋮ | ⋮ | ⋮ |

| USER ID | PASSWORD | PUBLIC KEY | USER ATTRIBUTE | TIME STAMP | SIGNATURE |
|---|---|---|---|---|---|

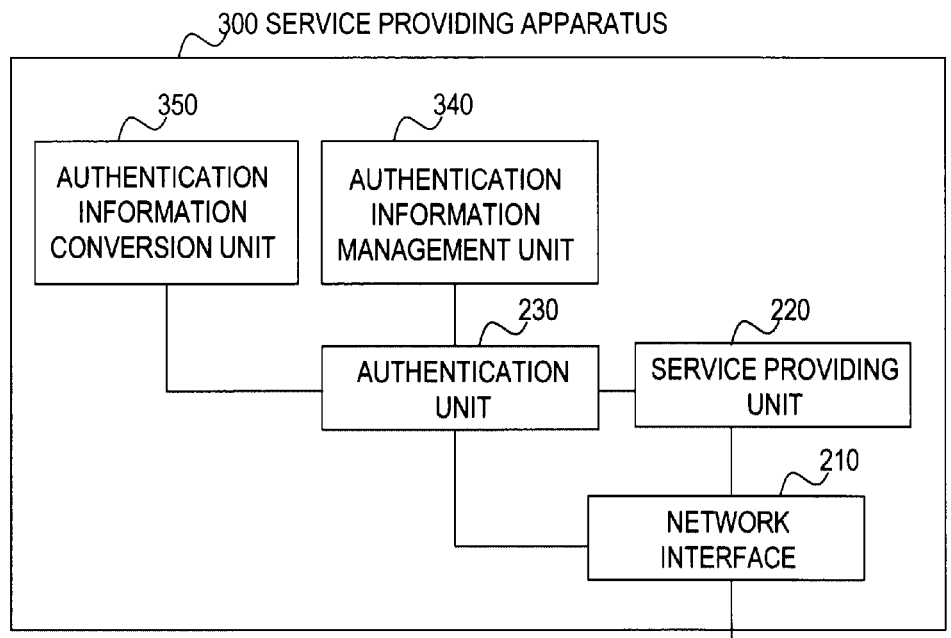

| USER ID | PASSWORD | USER ATTRIBUTE |
|---------|----------|----------------|
| 1001 | abcdef | IP ADDRESS 1, ADDRESS 1, CARD NUMBER 1 |
| 1002 | defghi | IP ADDRESS 2, ADDRESS 2, CARD NUMBER 2 |
| ⋮ | ⋮ | ⋮ |

FIG. 12

| USER ID | PASSWORD | PUBLIC KEY |
|---------|----------|------------|
| 1001 | abcdef | 48572096872 |
| 1002 | defghi | 87039834096 |
| ⋮ | ⋮ | ⋮ |

FIG. 13

| SERVER CERTIFICATE | USER ID | PUBLIC KEY | PRIVATE KEY | PASSWORD |
|---|---|---|---|---|
| CERTIFICATE 1 | 1001 | 48572096872 | 5353453656 | abcdef |
| CERTIFICATE 2 | 2002 | 63560398634 | 7767547375 | — |
| ⋮ | ⋮ | ⋮ | ⋮ | ⋮ |

| CONSENT CONFIRMATION \ STRENGTH | 0 (LOW) | 1 (MIDDLE) | 2 (HIGH) |
|---|---|---|---|
| 0 (NO) | NA, PK, OK, PW, PKPW | PK, PW, PKPW | PK, PKPW |
| 1 (YES) | OK, PW, PKPW | PW, PKPW | PKPW |

FIG. 22A

| CONSENT CONFIRMATION \ STRENGTH | 0 (LOW) | 1 (MIDDLE) | 2 (HIGH) |
|---|---|---|---|
| 0 (NO) | NA, OK, PW | PW | (PW) |
| 1 (YES) | OK, PW | PW | (PW) |

FIG. 22B

| USER ID | PASSWORD | PUBLIC KEY | USER ATTRIBUTE | TIME STAMP | USER POLICY | SIGNATURE |
|---|---|---|---|---|---|---|

FIG. 23

| CONSENT CONFIRMATION \ STRENGTH | 0 (LOW) | 1 (MIDDLE) | 2 (HIGH) |
|---|---|---|---|
| 0 (NO) | <2,0> | <2,0> | <2,0> |
| 1 (YES) | <2,1> | <2,1> | <2,1> |

FIG. 24A

| CONSENT CONFIRMATION \ STRENGTH | 0 (LOW) | 1 (MIDDLE) | 2 (HIGH) |
|---|---|---|---|
| 0 (NO) | <0,0> | <2,0> | <2,0> |
| 1 (YES) | <1,1> | <1,1> | <2,1> |

FIG. 24B

| USER ID | PASSWORD | PUBLIC KEY | USER ATTRIBUTE | USER POLICY |
|---|---|---|---|---|
| 1001 | abcdef | 48572096872 | IP ADDRESS 1, ADDRESS 1, CARD NUMBER 1 | POLICY 1 |
| 1002 | defghi | 87039834096 | IP ADDRESS 2, ADDRESS 2, CARD NUMBER 2 | POLICY 2 |
| ⋮ | ⋮ | ⋮ | ⋮ | ⋮ |

```
GET /form.html HTTP/1.1
```

```
HTTP/1.1 200 OK

<html>
...
<form action="authenticate.cgi" method="post">
<!--EXTENSION TAG-->
<auth policy="PK" svr_challenge="server challenge" msg="CLICK AUTHENTICATE BUTTON"
svr_timestamp="2007-01-30 18:20:00" svr_sig=SIGNATURE OF SERVICE PROVIDING APPARATUS
cert=CERTIFICATE OF SERVICE PROVIDING APPARATUS
<input type="submit" value="AUTHENTICATION">
</form>
...
</html>
```

```
POST authenticate.cgi HTTP/1.1
method=PK&uid=Taro&pwd=MyPassword&challenge=ChallengeValue&timestamp=
Fri+Feb+02+2007+20%3A58%3A51+GMT%2B0900&sig=SignatureValue
```

```
HTTP/1.1 200 OK
<html>
...
<script src="file:///UserDirectory/authScript.js" type="text/javascript">
</script><!-- READ SCRIPT HELD IN CLIENT DEVICE --->

<form action="authenticate.cgi" method="post" onsubmit="return sub() ;">
<input type="hidden" id="policy" value="PK">
<input type="hidden" id="svr_challenge" value="server challenge">
<input type="text" id="msg" value="Message from server">
<input type="hidden" id="svr_timestamp" value="2007-01-30 18:20:00">
<input type="hidden" id="svr_sig" value="server signature">
<input type="hidden" id="cert" value="server certificate">
<br>
<input type="hidden" id="method" name="method" value="">
<label>User ID</label><input type="text" id="uid" name="uid">
<label>Password</label><input type="password" id="pwd" name="pwd">
<input type="hidden" id="challenge" name="challenge" value="">
<input type="hidden" id="timestamp" name="timestamp" value="">
<input type="hidden" id="sig" name="sig" value="">

<input type="submit" value="AUTHENTICATION">
</form>
...
</html>
```

FIG. 28

```
function makeResponseForPK (severChallenge, uid, pwd) {
    // CALCULATE RESPONSE (PK)
    return responese;
} function makeResponseForPKPW (severChallenge, uid, pwd) {
    // CALCULATE RESPONSE (PKPW)
    return responese;
} function sign (method, uid, challenge, timestamp) {
    // CALCULATE SIGNATURE
    return signature;
} function verifySignature (cert, signature) {
    // RETURN true OR false DEPENDING ON WHETHER
    // SIGNATURE VERIFICATION FAILS OR SUCCEEDS
} function sub () {
    var cert=document.getElementById("cert");
    var ss=document.getElementById("svr_sig");
    var sc=document.getElementById("svr_challenge");
    var pw=document.getElementById("pwd");
    var u=document.getElementById("uid");
    var p=document.getElementById("policy");
    var m=document.getElementById("method");
    var c=document.getElementById("challenge");
    var t=document.getElementById("timestamp");
    var s=document.getElementById("sig");
    var ret;

if (verifySignature(cert.value, ss.value)!=true) {
        alert("Signature verification failed!");
        return false;
    } switch (p.value) {
    case "PW":
        m.value="PW";
        ret=true;
        break;
    case "PK":
        m.value="PK";
        c.value=makeResponseForPK(sc.value, u.value, c.value, t.value);
        t.value=new Date();
        s.value=sign(m.value, u.value, c.value, t.value);
        ret=true;
        break;
    case "PKPW":
        m.value="PKPW";
        c.value=makeResponseForPKPW(sc.value, u.value, c.value, pw.value);
        t.value=new Date();
        s.value=sign(m.value, u.value, c.value, t.value);
        ret=true;
        break;
    default:
        ret=false;
    }
    return ret;
}
```

FIG. 29

| USER ID | PASSWORD OR PASSWORD AUTHENTICATION INFORMATION | PUBLIC KEY 2 | TIME STAMP | SIGNATURE 3 | SIGNATURE 4 |

CLIENT DEVICE, KEY DEVICE, SERVICE PROVIDING APPARATUS, USER AUTHENTICATION SYSTEM, USER AUTHENTICATION METHOD, PROGRAM, AND RECORDING MEDIUM

TECHNICAL FIELD

The present invention relates to user authentication systems for authenticating a user and providing a service for the authenticated user, to user authentication methods, to client devices, key devices, and service providing apparatuses constituting the user authentication systems, to programs for operating a computer as one of the devices and apparatuses, and to recording media having the programs recorded thereon.

BACKGROUND ART

As the Internet and other networks have become commonplace, online shopping, content services, and other online services have been increasing. In an ordinary online service, a service providing apparatus that provides the user with a service and a client device that performs user authentication for the service providing apparatus are connected to a network. The user performs user authentication to the service providing apparatus through the client device. The service providing apparatus then provides a service based on the result of the user authentication.

Password authentication has become a widespread user authentication method that can be easily implemented. To provide improved security by password authentication, a different password must be specified for each service, and the password must be as long as possible. Then, the user has to go through the trouble of memorizing all the passwords specified for the services. Actually, the user is likely to specify a common password or a short password that is easy to memorize, making it difficult to ensure security. Moreover, password authentication has a high risk of password leakage by phishing or the like.

A technology combining password authentication with an authentication method based on a public key cryptosystem (public key authentication) has been proposed. For example, in a user authentication system disclosed in Patent literature 1, a terminal device, a business server, and a proxy authentication feature are connected to a network. When the user uses the business server through the terminal device, the proxy authentication feature authenticates the user using the terminal device in place of the business server and, if the validity is verified, a series of processes is executed in the business server. The proxy authentication feature performs authentication using user authentication information such as the user ID and the password. The proxy authentication feature further receives from the terminal device a digital signature (hereafter simply "signature") calculated for a session ID sent from the proxy authentication feature to the terminal device, by using the private key of the terminal device, and verifies the signature, thereby performing stronger authentication. By using a single proxy authentication feature for authentication in a plurality of business servers, charges for using the business servers can be added up and collected by proxy. By adding the proxy authentication feature, the business servers can be used without modification.

Patent literature 1: Japanese Patent Application Laid Open No. 2002-132727

DISCLOSURE OF THE INVENTION

Problems to be Solved by the Invention

As described above, with a proxy authentication feature added, the user authentication system disclosed in patent literature 1 can provide more secure authentication means than password authentication, without modifying an existing business server.

The related art described above requires advance setup for registering the user ID and password of the business server user to the proxy authentication feature, since the proxy authentication feature and the business server are separate. Online services are likely to be used without advance registration, and the related art described above is not suitable for the unprepared use of online services.

While password authentication is enough for some services, some other services use a terminal having no function for generating a signature. Necessary or possible authentication means depend on the services. Therefore, it is preferable that the authentication means can be switched in accordance with the service and the environment of the user terminal. In the user authentication system described above, the proxy authentication feature and business server are separate and there is no procedure for exchanging information between the terminal and the business server, so that it is difficult to switch the authentication means.

In typical services such as online shopping on the Web, a password authentication procedure, as viewed from the user, is embedded in a service provision procedure. A public key authentication procedure must be combined smoothly with the service provision procedure. The conventional user authentication system requires advance authentication by the proxy authentication feature. Therefore, it is difficult to perform public key authentication in the service provision procedure.

Password authentication has the effect of confirming that information that only the true user can know is provided (the effect of obtaining consent). Public key authentication generally does not have the function of consent confirmation. To add a consent confirmation function to a device performing public key authentication, password authentication and public key authentication must be combined. Moreover, it is preferable that evidence of consent confirmation be left for later confirmation.

In the user authentication system described above, it is difficult to provide both strong authentication and consent confirmation because the proxy authentication feature and the business server are separate and because the consent confirmation is not reported to the business server in a provable form.

The present invention has been provided in view of the problems described. An object of the present invention is to provide a user authentication system and a user authentication method that can switch between password authentication and public key authentication without advance setup of a proxy authentication feature or the like by a third party. Another object of the present invention is to provide a secure and reliable user authentication system and method that offer a strong degree of public key authentication and the consent confirmation of password authentication.

Means to Solve the Problems

A user authentication system of the present invention includes a client device, a service providing apparatus, and a network connecting them. The client device may be connected to a key device.

The client device of the present invention includes a client authentication information management unit that holds a service information database storing a user ID, a public key, a private key, and a server certificate in association with each service; a control unit; a client authentication unit; and a key generation unit; and has a request function, a server authentication function, a user information transmission function, a service information registration function, and an authentication response function.

The request function allows the control unit to send a user registration request and a service request to the service providing apparatus. The server authentication function allows the client authentication unit to verify server authentication information and an authentication request sent from the service providing apparatus. The user information transmission function allows the client authentication unit to obtain a signature for a user ID, a password, a user attribute, and a public key generated by the key generation unit, by using a private key generated in the key generation unit, and to send to the service providing apparatus user information that includes the user ID, the password, the user attribute, the public key, and the signature. The service information registration function allows the client authentication information management unit to register service information that includes the user ID, the public key, the private key, and a server certificate, in the service information database.

In the authentication response function, if an authentication method identified from an authentication policy included in the authentication request is password authentication, the client authentication unit calculates password authentication information with which the possession of the password can be confirmed from the password and sends to the service providing apparatus an authentication response that includes the password authentication information, the authentication method, and the user ID. If the authentication method identified from the authentication policy is public key authentication, the client authentication unit calculates a signature 1 for the authentication method, the user ID, and a challenge included in the authentication request, and sends an authentication response that includes the signature 1, the authentication method, the user ID, and the challenge included in the authentication request to the service providing apparatus. If the authentication method identified from the authentication policy is public-key-and-password combination authentication, the client authentication unit calculates a signature 2 for the authentication method, the user ID, the challenge included in the authentication request, and the password, and sends an authentication response that includes the signature 2, the authentication method, the user ID, and the challenge included in the authentication request to the service providing apparatus.

When the client device is connected to the key device, what the client device must have are just the control unit and the request function. The key device includes the client authentication information management unit, the client authentication unit, and the key generation unit, and has the server authentication function, the user information transmission function, the service information registration function, and the authentication response function.

A service providing apparatus of the present invention includes a service-providing-apparatus authentication information management unit that holds a user information database storing a user ID, a password, a user attribute, and a public key in association with each user; a service providing unit; and a service-providing-apparatus authentication unit, and has a registration request response function, a user registration function, a service request response function, an authentication processing function, and a service providing function. In the registration request response function, the service-providing-apparatus authentication unit sends, in response to a user registration request sent from a client device, server authentication information that includes a server certificate and a signature to the client device. In the user registration function, when the service-providing-apparatus authentication unit receives user information from the client device and verifies a signature, if the verification is successful, the service-providing-apparatus authentication information management unit registers user information that includes a user ID, a password, a user attribute, and a public key, in the user information database and sends a message indicating a successful user registration to the client device. In the service request response function, the service-providing-apparatus authentication unit sends to the client device, in response to a request for a service, sent from the client device, an authentication request that includes an authentication policy indicating whether an authentication method for the service is password authentication, public key authentication, or public-key-and-password combination authentication; a server certificate; and a signature.

In the authentication processing function, the service-providing-apparatus authentication unit receives an authentication response from the client device and confirms the authentication method included in the authentication response. Verification is performed in the following way. If the confirmation is successful, the service-providing-apparatus authentication information management unit identifies an entry corresponding to a user ID included in the authentication response. If the confirmed authentication method is password authentication, the service-providing-apparatus authentication information management unit obtains a password from the entry and collates the password with a password or password authentication information included in the authentication response; if the confirmed authentication method is public key authentication, the service-providing-apparatus authentication information management unit obtains a public key from the entry and confirms the validity of a signature 1 included in the authentication response; and if the confirmed authentication method is public-key-and-password combination authentication, the service-providing-apparatus authentication information management unit obtains the public key from the entry and confirms the validity of a signature 2 included in the authentication response.

In the service providing function, the service providing unit judges whether the service can be provided and provides the service if the service can be provided.

Effects of the Invention

According to the user authentication system of the present invention, when the user performs user registration to the service providing apparatus through the client device, the client device obtains a signature for the user ID, the password, the user attribute, and the public key, by using a private key corresponding to the public key, and sends user information that includes at least the user ID, the password, the user attribute, the public key, and the signature to the service providing apparatus. The service providing apparatus receives the user information and verifies the signature by using the public key, and if the verification is successful, stores the user information, which is information by which the password and the public key are associated with each other. Because the password and the public key are associated in a secure manner, it is possible to easily switch between password authentication and public key authentication.

When the user makes a request for a service through the client device to the service providing apparatus, the service providing apparatus sends to the client device an authentication request that includes an authentication policy indicating whether the authentication method for the service is password authentication, public key authentication, or public-key-and-password combination authentication. For password authentication, the client device calculates password authentication information with which the possession of the password can be confirmed, from the password or the like input by the user. For public key authentication, the client device obtains a signature for the user ID and the challenge included in the authentication request, by using the private key. For public-key-and-password combination authentication, the client device obtains a signature for the user ID, the challenge included in the authentication request, and the password input by the user, by using the private key. The client device sends an authentication response that includes these items to the service providing apparatus. Accordingly, both the strength of public key authentication and the consent confirmation function of the password can be provided.

Because the service providing apparatus stores the password and the public key in association, the processing to be performed after public key authentication can be the same as that performed after password authentication. Whereas the technology disclosed in Patent literature 1 requires a proxy authentication feature on a network, the present invention does not require any device besides the client device and the service providing apparatus. Therefore, a conventional service providing apparatus, which uses just password authentication, can be replaced easily to a service providing apparatus according to the present invention.

BRIEF DESCRIPTION OF THE DRAWINGS

FIG. 9 illustrates details of an authentication request in the first embodiment;

FIG. 10A illustrates details of an authentication response in the first embodiment when the authentication method is PW;

FIG. 10B illustrates details of the authentication response in the first embodiment when the authentication method is PK;

FIG. 10C illustrates details of the authentication response in the first embodiment when the authentication method is PKPW;

FIG. 11 is a diagram showing the structure of a service providing apparatus of a second embodiment;

FIG. 12 is a diagram showing the format of a user information database in the service providing apparatus of the second embodiment;

FIG. 13 is a diagram showing the format of an authentication information conversion database in the service providing apparatus of the second embodiment;

FIG. 22A illustrates an example of an authentication method correspondence table in a user authentication system of a fourth embodiment;

FIG. 22B illustrates another example of the authentication method correspondence table in the user authentication system of the fourth embodiment;

FIG. 23 illustrates details of user information in a modification of the fourth embodiment;

FIG. 24A illustrates a specific example of a user policy in the modification of the fourth embodiment;

FIG. 24B illustrates another specific example of the user policy in the modification of the fourth embodiment;

FIG. 25 is a diagram showing the format of a user information database in a service providing apparatus of the modification of the fourth embodiment;

FIG. 27A illustrates a data format of a service request in a user authentication system of a fifth embodiment;

FIG. 27B illustrates a data format of an authentication request in the user authentication system of the fifth embodiment;

FIG. 27C illustrates a data format of an authentication response in the user authentication system of the fifth embodiment;

FIG. 28 illustrates a data format of an authentication request in a user authentication system of a modification of the fifth embodiment;

FIG. 29 illustrates the contents of an authentication script in the user authentication system of the modification of the fifth embodiment;

BEST MODES FOR CARRYING OUT THE INVENTION

Figure 1:
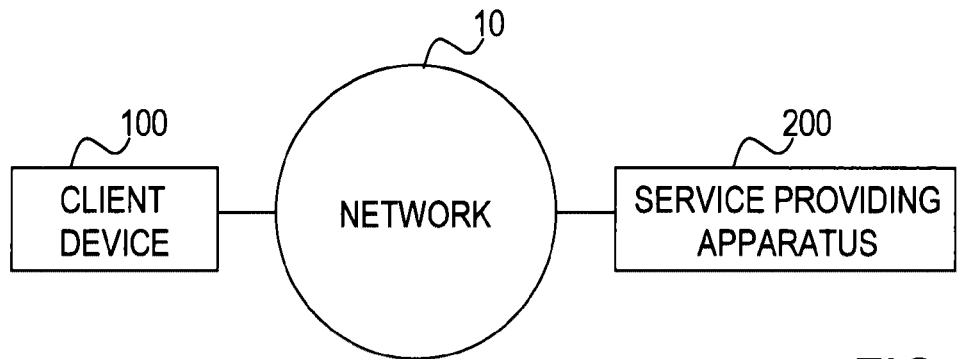
FIG. 1 is a diagram showing an outlined structure of a user authentication system of a first embodiment.

To avoid duplication in the subsequent description, elements having identical functions and steps for performing the same processing will be given identical reference numerals, and the description of them will be omitted.

First Embodiment

FIG. 1 shows the structure of a user authentication system of a first embodiment. A client device 100 and a service providing apparatus 200 are connected through a network 10 in such a way that they can communicate with each other. The network 10 is the Internet or a corporate private network, for instance. The service providing apparatus 200 is an apparatus that offers services to the user, such as a web server. The client device 100 sends an authentication response to the service providing apparatus 200 for user authentication and is a device such as a mobile phone having a browser function, a personal computer, or a personal digital assistant (PDA), for instance. A plurality of client devices 100 and a plurality of service providing apparatuses 200 may be connected to the network 10.

Figure 2:
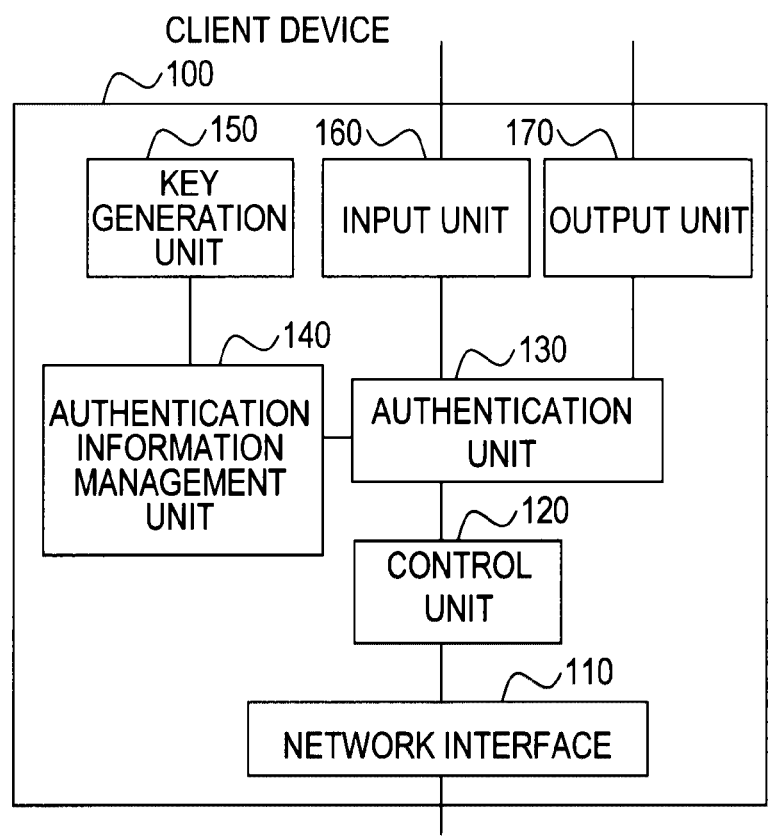
FIG. 2 is a diagram showing the structure of a client device of the first embodiment.

FIG. 2 shows an example structure of the client device 100 of the first embodiment. The client device 100 includes a network interface 110, a control unit 120, an authentication unit 130, an authentication information management unit 140, a key generation unit 150, an input unit 160, and an output unit 170.

The network interface 110 is connected to the network 10 and communicates with the service providing apparatus 200. The control unit 120 controls the entire client device 100 and may be implemented by a browser program, for instance.

The authentication unit 130 receives an authentication request from the service providing apparatus 200 through the network interface 110 and sends an authentication response, which is necessary for user authentication, through the network interface 110 to the service providing apparatus 200. The authentication unit 130 exchanges information with the user through the output unit 170 or the input unit 160, by displaying a prompt, inputting a password, and confirming consent.

The authentication information management unit 140 stores key information, which is needed to generate an authentication response for user authentication, in association with a certificate of the service providing apparatus 200 and holds a service information database, which will be described later. The key generation unit 150 generates key information to be stored in the authentication information management unit 140.

The input unit 160 is a keyboard, mouse, or other device that receives input from the user. The output unit 170 is a display unit or the like that outputs (shows) information to the user.

Figures 3, 4, 5:
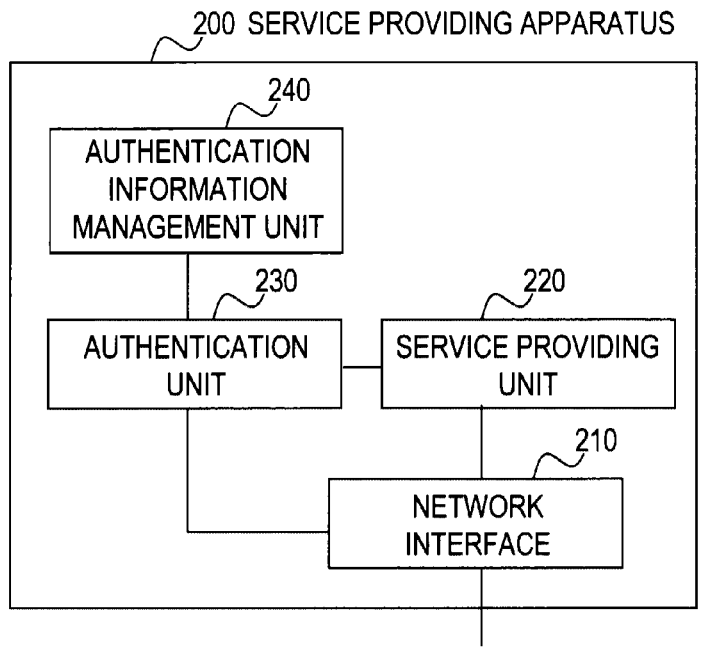
FIG. 3 is a diagram showing the structure of a service providing apparatus of the first embodiment.
FIG. 4 is a diagram showing the format of a service information database in the client device of the first embodiment.
FIG. 5 is a diagram showing the format of a user information database in the service providing apparatus of the first embodiment.

FIG. 3 shows an example structure of the service providing apparatus 200 of the first embodiment. The service providing apparatus 200 includes a network interface 210, a service providing unit 220, an authentication unit 230, and an authentication information management unit 240.

The network interface 210 is connected to the network 10 and communicates with the client device 100. The service providing unit 220 judges whether a service can be offered to the user who has been successfully authenticated and, if yes, provides the service. Services that can be offered include online content delivery to the client device 100 and order receiving processing for delivering goods to the user, for example. The service providing unit 220 stores an authentication policy, which will be described later, concerning each service.

The authentication unit 230 sends an authentication request to the client device 100 through the network interface 210 and receives an authentication response from the client device 100. The authentication information management unit 240 stores key information and a password, which are needed to confirm an authentication response for user authentication, in association with the service to be provided and holds a user information database, which will be described later.

FIG. 4 shows an example format of the service information database held in the authentication information management unit 140 of the client device 100. Each row corresponds to a single service. Columns will be described below. A first column has a server certificate of a service providing apparatus that offers a service. A second column has a user ID assigned to a user in relation to the utilization of the service. A third column has a public key which is used in the verification of an authentication response when the service is used. A fourth column has a private key which is used in the generation of the authentication response when the service is used.

FIG. 5 shows the format of the user information database held in the authentication information management unit 240 of the service providing apparatus 200. Each row corresponds to a single user. A first column has the user ID of the user using the service. A second column has a password of the user used in user authentication when the service is used. A third column has the public key of the user, used in the verification of the authentication response when the service is used. A fourth column has user attributes required when the service is used. The user attributes include the IP address of the client device 100 for content delivery, the address of the user for delivery of goods, and user's credit card number for payment, for example.

User Registration

Figures 6, 7:
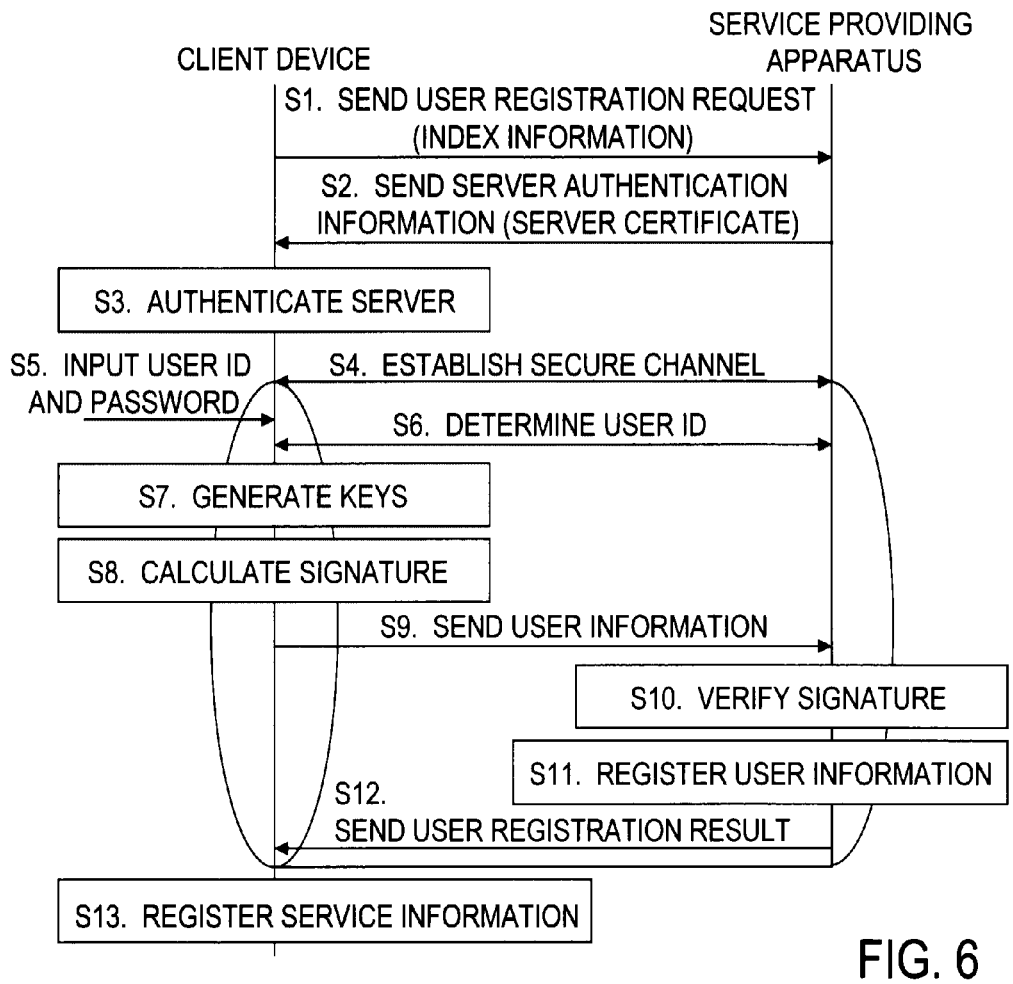
FIG. 6 is a flowchart showing the flow of a user registration process in the user authentication system of the first embodiment.
FIG. 7 illustrates details of user information in the first embodiment.

A procedure for user registration to the service providing apparatus 200, performed by the user through the client device 100, will be described. FIG. 6 shows the flow of the user registration process. The control unit 120 in the client device 100 sends a user registration request through the network interface 110 to the service providing apparatus 200 (S1). The user registration request is, for example, an HTTP request that is sent when registration for a particular service is selected on a Web page. The user registration request may include index information for identifying the service to be used. The index information is a URI included in the HTTP request, for example.

Upon receiving the user registration request, the service providing apparatus 200 has the authentication unit 230 generate server authentication information. The service providing apparatus 200 sends the generated server authentication information through the network interface 210 to the client device 100 (S2). The server authentication information includes a digital signature, a server certificate, and other information and allows the validity of the service providing apparatus 200 to be confirmed.

The service providing apparatus 200 may send to the client device 100 a program determining the processing flow of the client device 100, together with the server authentication information. The program sent in step S2 eliminates the need for storing such a program in the client device 100 beforehand. The client device 100 does not need to store a processing procedure: What the client device 100 should have are individual functions such as server authentication (S3), key generation (S7), and signature calculation (S8), as well as a database, which will be described later. If a program describing a processing procedure is sent for each process, it would be easy to add to or modify the process.

Upon receiving the server authentication information, the client device 100 has the authentication unit 130 verify the server authentication information (S3). If the verification fails, the client device 100 terminates the user registration procedure. If the verification succeeds, the client device 100 performs the following process.

The client device 100 and the service providing apparatus 200 establish a secure channel between them in order to ensure integrity and confidentiality of data to be exchanged later (S4). The steps S2 to S4 may use an existing protocol such as the Secure Sockets Layer (SSL).

The output unit 170 in the client device 100 outputs a message prompting the user to determine and input a user ID and password. The input unit 160 in the client device 100 receives the user ID and password input by the user (S5). The control unit 120 in the client device 100 communicates with the service providing unit 220 in the service providing apparatus 200 and determines the user ID (S6). In the procedure described for this embodiment, the user determines his or her user ID, and the client device 100 sends the ID to the service providing apparatus 200. Another possible procedure is that the service providing apparatus 200 determines the user ID and reports it to the client device 100.

Then, the key generation unit 150 in the client device 100 generates a key pair (S7). The key pair is a pair of a private key and a public key to be used in a public key cryptosystem. The client device 100 collects user information necessary for user registration and calculates a digital signature (hereafter simply "signature") (S8).

FIG. 7 shows an example of user information. The user information includes a user ID, a password, a public key, a user attribute, a time stamp, and a signature. The user attribute is user information needed to provide a service, such as an address, a name, and a credit card number. The signature has been obtained through calculation using the private key with respect to the user information other than the signature. The user information contains the public key for verifying the signature. Therefore, the user information functions also as a self-signed certificate.

The description of the user registration procedure will continue. The control unit 120 in the client device 100 sends the user information shown in FIG. 7 through the network interface 110 to the service providing apparatus 200 (S9). Upon receiving the user information, the service providing apparatus 200 has the authentication unit 230 verify the validity of the user information (S10). More specifically, the authentication unit 230 verifies the signature included in the user information by using the public key included in the user information and confirms that the time stamp included in the user information is appropriate.

If the verification fails, the service providing apparatus 200 sends "failure" as the result of user registration to the client device 100 (S12). If the verification succeeds, the service providing apparatus 200 performs the following process. The authentication information management unit 240 in the service providing apparatus 200 registers the user information in the user information database (S11). The user information database has the format as described earlier. The service providing apparatus 200 sends "OK" as the result of user registration, through the network interface 210 to the client device 100 (S12).

If the result of user registration is "failure", the client device 100 terminates the user registration procedure. If the result of user registration is "OK", the authentication information management unit 140 in the client device 100 registers the service information (information associating the server certificate received in step S2 with the user ID, public key, and private key) in the service information database (S13). The service information database has the format as described earlier. By registering the user information in the service providing apparatus 200 after the user information is verified, the relationship between the key pair held in the client device 100 and the password memorized by the user is guaranteed. Moreover, the relationship between the key pair and the attribute information input by the user at registration is guaranteed.

User Authentication

Figure 8:
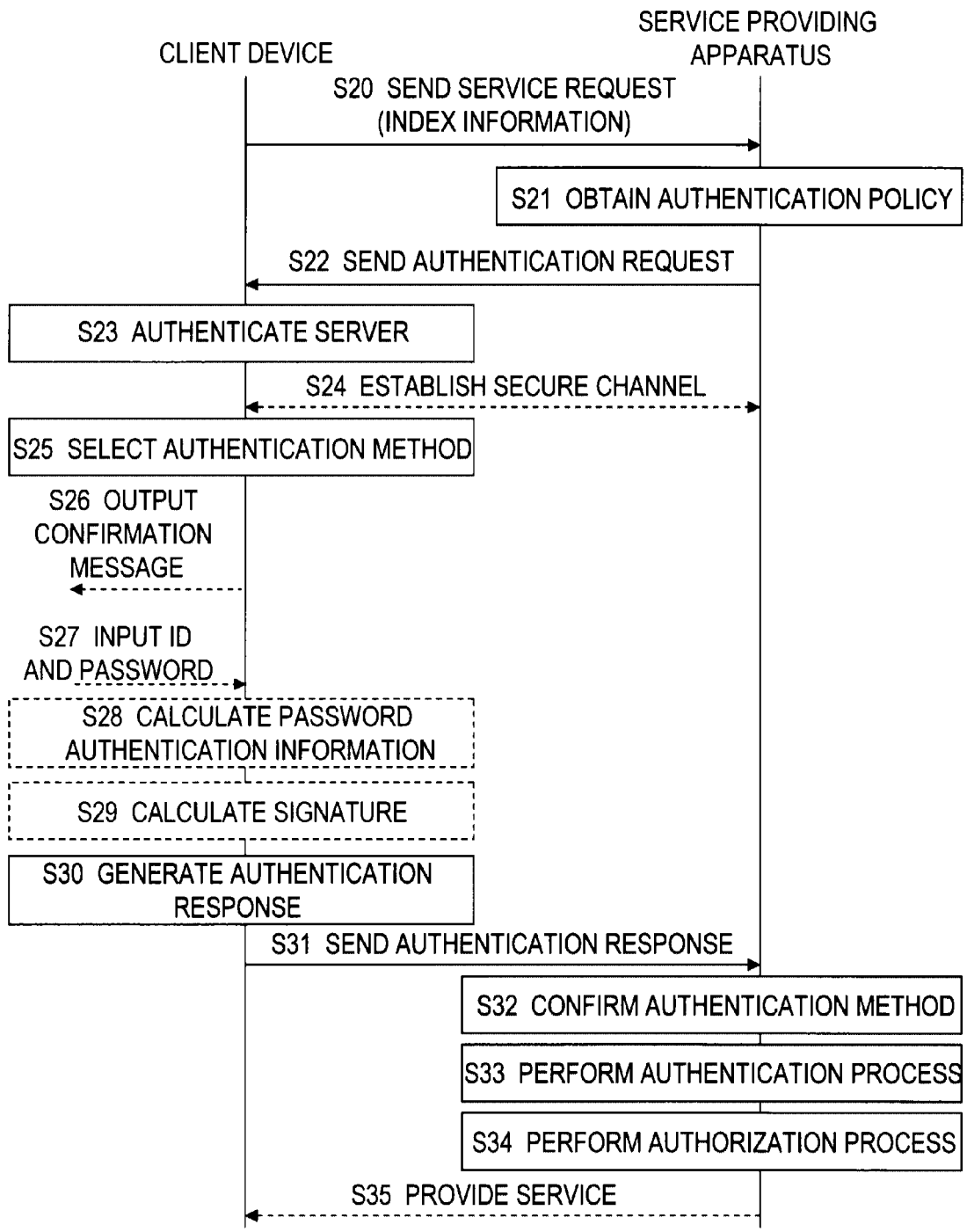
FIG. 8 is a flowchart showing the flow of a user authentication process in the user authentication system of the first embodiment.

FIG. 8 shows a user authentication procedure. The control unit 120 in the client device 100 sends a service request through the network interface 110 to the service providing apparatus 200 (S20). The service request is, for example, an HTTP request that is sent when the use of a certain service is selected on a web page. The service request may include index information for identifying the service to be used. The index information is, for example, a URI included in the HTTP request.

Upon receiving the service request, the service providing apparatus 200 has the service providing unit 220 obtain an authentication policy concerning the requested service (S21). The authentication policy defines, for example, the strength of authentication needed to provide a service, whether consent is confirmed or not, and the like. In this embodiment, a request for public key authentication (PK), a request for password authentication (PW), and a request for authentication by a combination of the public key and the password (PKPW) are used as an authentication policy. The authentication policy is obtained by reading the authentication policy stored for each service beforehand, for example.

The authentication unit 230 in the service providing apparatus 200 generates an authentication request and sends the request through the network interface 210 to the client device 100 (S22). The service providing apparatus 200 may send to the client device 100 a program determining the flow of the process to be performed by the client device 100, together with the authentication request. The program sent in step S22 eliminates the need for storing such a program in the client device 100 beforehand. Therefore, the client device 100 does not need to store the processing procedure: What the client device 100 should have are individual functions such as server authentication (S23) and signature calculation (S29), as well as a database, which will be described later. If a program describing a processing procedure is sent for each process, it would be easy to add to or modify the process.

FIG. 9 shows an example format of an authentication request. The authentication request includes an authentication policy, a challenge, a confirmation message, a time stamp, a signature, and a server certificate. The authentication policy is obtained in step S21. The challenge is a value that the client device 100 uses to calculate an authentication response for an authentication request, and is, more specifically, a random number or the like. The challenge may be omitted if a password authentication request is made on a secure channel. The confirmation message is displayed to the user during authentication and shows an item about which user's consent is required. The confirmation message can be omitted. The time stamp is information for confirming the date and time when the authentication request is generated. The signature has been calculated by using the private key held in the service providing apparatus 200 with respect to the authentication policy, challenge, and time stamp. The server certificate includes the public key for use in verification of the signature.

The description of the user authentication procedure will continue. Upon receiving the authentication request, the client device 100 has the authentication unit 130 verify the authentication request (S23). More specifically, the signature included in the authentication request is verified with the public key included in the received server certificate, and the contents of the server certificate are confirmed.

If the verification fails, the client device 100 terminates the user authentication procedure. If the verification succeeds, the client device 100 performs the following process. The client device 100 and the service providing apparatus 200 establish a secure channel (S24), if necessary, to ensure integrity and confidentiality of data to be exchanged later. Steps S22 to S24 may use an existing protocol such as the SSL. The client device 100 selects an authentication method with reference to the authentication policy included in the authentication request received from the service providing apparatus 200 (S25). For example, the specified authentication policy can be used. Alternatively, a new authentication policy calculated from both the specified authentication policy and the authentication policy held in the client device 100, can be used, for instance.

If the selected authentication method is PW, the client device 100 performs the following: If the authentication request includes a confirmation message, the output unit 170 outputs the confirmation message. If the authentication request does not contain a confirmation message, the output unit 170 outputs a message prompting the user to input the user ID and password (S26). The input unit 160 receives the user ID and password input by the user (S27). The user ID may be obtained in the following procedure: The service information database held in the authentication information management unit 140 is searched by using the server certificate received in step S22, and the corresponding service entry is identified. From the user ID field of the entry, the user ID is obtained. Then, the authentication unit 130 in the client device 100 calculates password authentication information from the input password or the like (S28). The password authentication information here is, for instance, a hash value calculated from the password, challenge, IP address of the client device 100, or the like. With the password authentication information, the possession of the password can be confirmed. The password itself can be used instead of the password authentication information. In that case, however, the password is sent through the network 10 to the service providing apparatus 200, as a part of the authentication response. Therefore, it is preferable that the client device 100 and the service providing apparatus 200 establish a secure channel in step S24. The control unit 120 in the client device 100 generates an authentication response that includes an authentication method (PW), a user ID, and a password or password authentication information (S30), as shown in FIG. 10A.

If the selected authentication method is PK, the authentication unit 130 in the client device 100 calculates signature 1 for the authentication method (PK), user ID, challenge, and time stamp (S29). Signature 1 is calculated for all the items, except the signature itself, of the information to be sent as the authentication response. If the IP address of the client device 100 and other items are added to the authentication response, those items will also become the input of the signature calculation. The challenge is the same as that included in the authentication request. The time stamp represents the time at which the authentication response is generated. The private key used for the signature is obtained in the following procedure: The service information database of the authentication information management unit 140 is searched by using the server certificate received in step S22, and the corresponding service entry is identified. With reference to the private key field of the entry, the private key is obtained. The control unit 120 in the client device 100 generates an authentication response formed of the authentication method (PK), user ID, challenge, time stamp, and signature 1 (S30), as shown in FIG. 10B.

When the selected authentication method is PKPW, the output unit 170 in the client device 100 outputs a confirmation message if the confirmation message is included in the authentication request. If the confirmation message is not included in the authentication request, the output unit 170 in the client device 100 outputs a message prompting the user to input the user ID and password (S26). The input unit 160 receives the user ID and password input by the user (S27). The authentication unit 130 in the client device 100 calculates signature 2 for the authentication method (PKPW), user ID, challenge, password, confirmation message, and time stamp (S29). If the IP address of the client device 100 or other items are added to the authentication response, those items will also become the input of the signature calculation. The private key used for the signature is stored in the service information database of the authentication information management unit 140, as when the authentication method is PK. The control unit 120 in the client device 100 generates an authentication response formed of the authentication method (PKPW), user ID, challenge, time stamp, and signature 2 (S30), as shown in FIG. 10C.

Neither the password nor the confirmation message is included in the authentication response because of the following reasons: The password can be obtained by searching the user information database of the authentication information management unit 240 in the service providing apparatus 200, in accordance with the user ID. Since it can be confirmed that the user has input the correct password into the client device 100 by verifying signature 2, the password does not need to be included in the authentication response. The confirmation message can also be identified by the service providing apparatus 200. Therefore, the confirmation message does not need to be included in the authentication response, in order to verify signature 2.

The client device 100 sends the authentication response generated for each authentication method, as described above, through the network interface 110 to the service providing apparatus 200 (S31). Upon receiving the authentication response, the authentication unit 230 in the service providing apparatus 200 confirms whether the authentication method included in the received authentication response matches the authentication policy included in the authentication request sent in step S22 (S32).

The authentication unit 230 performs its authentication process (S33). More specifically, the authentication unit 230 searches the user information database of the authentication information management unit 240 in accordance with the user ID included in the authentication response and identifies the entry of the corresponding user. Depending on the authentication method, the following process is performed. If the authentication method included in the authentication response is PW, the authentication unit 230 obtains a password from the user entry and checks whether it matches the password or password authentication information included in the authentication response. If the authentication method included in the authentication response is PK, the authentication unit 230 obtains the public key from the user entry and confirms the validity of signature 1 included in the authentication response information by using the public key. The authentication unit 230 checks also whether the time stamp is appropriate (whether the represented time is close to the current time) and whether the challenge is the same as that sent in the authentication request in step S22. If the authentication method included in the authentication response is PKPW, the authentication unit 230 obtains the public key from the user entry and checks the validity of signature 2 included in the authentication response information by using the public key. For the verification of signature 2, the same items as those used when signature 2 was generated in step S29 must be obtained. The password, which is one of the items, can be obtained with reference to the user entry. The confirmation message can be obtained with reference to the confirmation message sent to the client device 100 in step S22. Therefore, the authentication response does not have to include the password or confirmation message for the verification of signature 2. As when the authentication method is PK, the authentication unit 230 further confirms whether the time stamp is appropriate and whether the challenge is the same as that sent in the authentication request in step S22.

If the authentication response of each verification method is verified successfully, the service providing unit 220 judges whether the service requested in step S20 can be provided to the user identified by the user ID (successfully authenticated user ID) included in the authentication response (S34). More specifically, the service providing unit 220 checks whether the service can be provided with reference to an authorization database or the like (not shown), where services that can be provided for the user identified by the user ID are registered beforehand, in the service providing unit 220. If the authentication and authorization succeed, the service providing apparatus 200 provides the service for the user (S35). If the authentication and authorization fail, the service providing apparatus 200 sends "failure" as the result of the service request, through the network interface 210 to the client device 100 (S35).

If the authentication method is PKPW, since it can be confirmed as described above that the user knows his or her password, the password does not need to be sent as an authentication response, which provides greater security. If the signature is verified successfully in step S32, it is guaranteed that the key pair held in the client device 100 used for user authentication corresponds to the public key included in the user information database held in the authentication information management unit 240 of the service providing apparatus 200. It is further guaranteed that the key pair held in the client device 100 used for user authentication corresponds to the key pair held in the client device 100 which has succeeded in user registration. That is, it is guaranteed that the client device used in user authentication is identical to the client device used in user registration. If the password input at registration is identical to the password input for authentication, it is guaranteed that the client device 100 is operated by the same user at both time points.

In the PKPW authentication, the authentication response includes the signature calculated by using the private key for the password. This makes it possible to associate the user knowing the password with the public key corresponding to the private key. With the public key, the user can be associated with the user attribute stored in the user information database held in the authentication information management unit 240 of the service providing apparatus 200. Consequently, the authenticating user is identified as the true user having the user attribute registered at the time of user registration.

In the PKPW authentication, the authentication response includes the signature obtained from the confirmation message by using the private key. If the client device 100 does not save the password input by the user, the input of the password by the user at authentication can be guaranteed by verifying the signature. If the output unit 170 outputs the confirmation message included in the authentication request to the user, user's consent to the confirmation message can be confirmed by the input of the password which only the user knows.

In the first embodiment, when the user receives a service from the service providing apparatus 200, the client device 100 verifies the validity of the server certificate included in the authentication request sent from the service providing apparatus 200 to the client device 100. The client device 100 identifies the service information associated with the successfully verified server certificate. The client device 100 also generates an authentication response by selecting or combining the password or the private key included in the identified service information in accordance with the authentication policy calculated from both the authentication policy included in the authentication request and the authentication policy held by the client device 100, and sends the authentication response to the service providing apparatus 200. This authentication procedure makes it difficult to obtain the user password fraudulently by masquerading as the service providing apparatus 200 and implements secure user authentication.

In the first embodiment, the user information sent in step S9 of the user registration procedure, the authentication request sent in step S22 of the user authentication procedure, and the authentication response sent in step S31 may follow the Security Assertion Markup Language (SAML) or another standard protocol.

Second Embodiment

A user authentication system of a second embodiment has the same system structure as the first embodiment (FIG. 1). FIG. 11 shows an example of the functional configuration of the service providing apparatus of the second embodiment. The service providing apparatus 300 differs from the service providing apparatus 200 of the first embodiment in the following points: An authentication information management unit 340 is included instead of the authentication information management unit 240; and an authentication information conversion unit 350 is included. The authentication information management unit 340 stores a password, which is necessary for user authentication, in association with a service to be provided. The authentication information conversion unit 350 converts the result of public key authentication (PK or PKPW) to a correct password, when necessary.

FIG. 12 shows the format of a user information database held in the authentication information management unit 340 of the service providing apparatus 300. Each row corresponds to a single user. A first column has a user ID assigned to the user to use a service. A second column has a user password used in user authentication when the service is used. A third column has user attributes which are needed when the service is used. The user information database held in the authentication information management unit 340 is a typical user information database common to services that require password authentication, and the database can be considered as being the same one as used conventionally.

FIG. 13 shows the format of an authentication information conversion database held in the authentication information conversion unit 350 of the service providing apparatus 300.

Each row corresponds to a single user. A first column has a user ID assigned to the user to use a service. A second column has a user password to be used in user authentication when the service is used. A third column has a user public key used in verification of the authentication response when the service is used. The authentication information conversion database held in the authentication information conversion unit 350 is combined with the user information database shown in FIG. 12 to implement the user authentication according to the present invention.

User Registration

Figure 14:
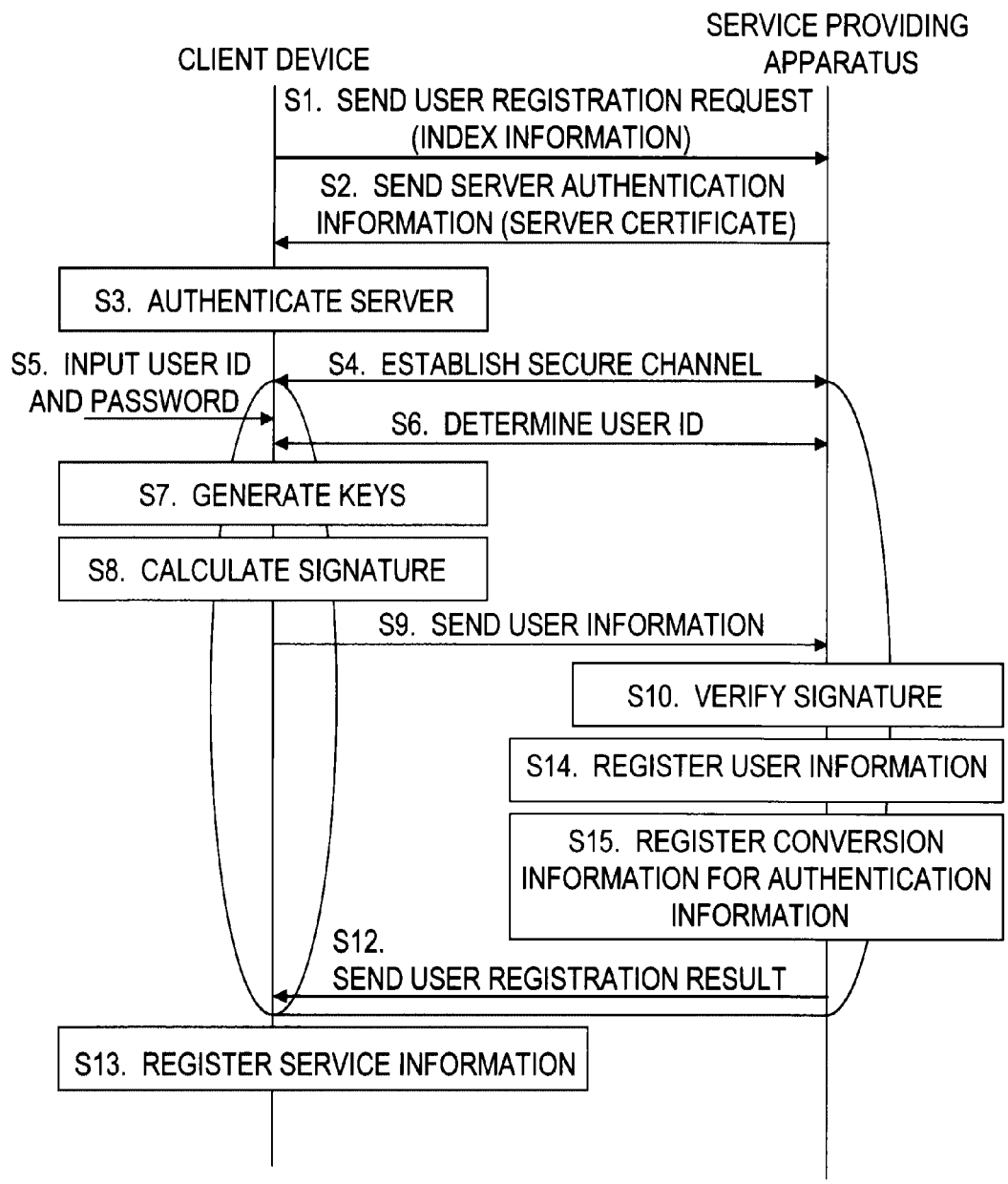
FIG. 14 is a flowchart showing the flow of a user registration process in the user authentication system of the second embodiment.

A procedure for user registration to the service providing apparatus 300, performed by the user through the client device 100 in the user authentication system of the second embodiment will be described. FIG. 14 illustrates the flow of the user registration process in the user authentication system of the second embodiment. Steps S1 to S10 are the same as those in the first embodiment (FIG. 6).

In step S10, if the validity of the user information received from the client device 100 is successfully verified, the service providing apparatus 300 groups a user ID, a password, and a user attribute taken from the user information formed of the user ID, password, public key, user attribute, time stamp, and signature, and stores the group in the user information database of the authentication information management unit 340 (S14). The service providing apparatus 300 stores a group of the user ID, public key, and password in the authentication information conversion database in the authentication information conversion unit 350 (S15). Step S12 and subsequent steps are also the same as in the first embodiment (FIG. 6).

User Authentication

Figure 15:
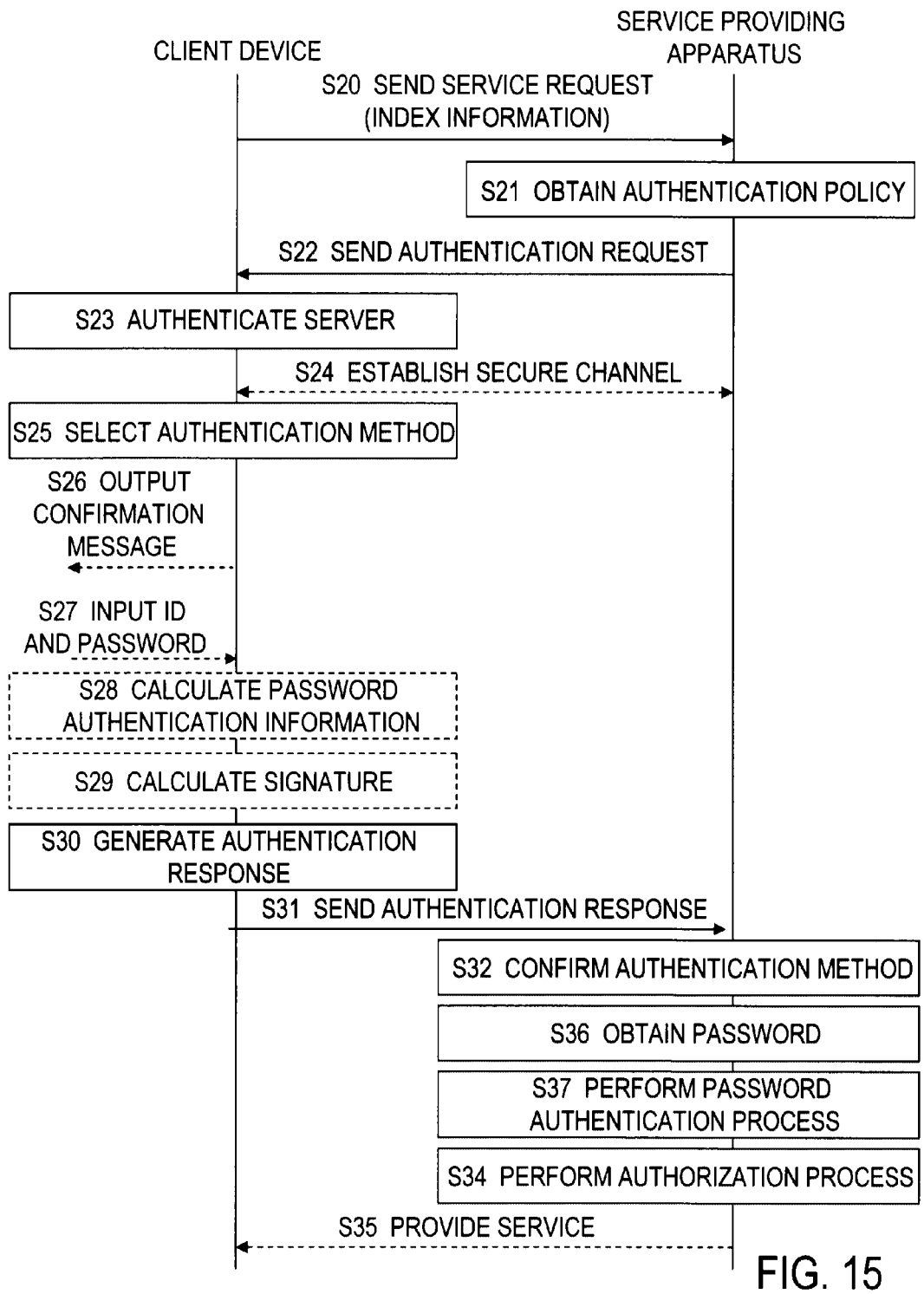
FIG. 15 is a flowchart showing the flow of a user authentication process in the user authentication system of the second embodiment.

A procedure for user authentication to the service providing apparatus 300, performed by the user through the client device 100 in the user authentication system according to the second embodiment will be described below. FIG. 15 shows the flow of the authentication process in the user authentication system of the second embodiment. Steps S20 to S32 are the same as those in the first embodiment (FIG. 8).

After step S32, the authentication unit 230 in the service providing apparatus 300 obtains the password in accordance with the authentication method (S36) as described below.

If the authentication method included in the authentication response is PW, the authentication unit 230 obtains the password or password authentication information from the authentication response.

If the authentication method included in the authentication response is PK, the authentication unit 230 searches the authentication information conversion database held in the authentication information conversion unit 350 in accordance with the user ID included in the authentication response and identifies the entry of the corresponding user. The authentication unit 230 confirms the validity of signature 1 included in the authentication response, by using the public key of the entry. The authentication unit 230 further confirms whether the time stamp is appropriate (whether the represented time is close to the current time) and whether the challenge is the same as that sent in the authentication request in step S22. If they are confirmed successfully, the authentication unit 230 obtains the password of the entry.

If the authentication method included in the authentication response is PKPW, the authentication unit 230 searches through the authentication information conversion database held in the authentication information conversion unit 350 in accordance with the user ID included in the authentication response and identifies the entry of the corresponding user. The authentication unit 230 confirms the validity of signature 2 included in the authentication response, by using the public key of the entry. If the confirmation succeeds, the authentication unit 230 obtains the password of the entry. The validity of signature 2 is confirmed in the same way as in the first embodiment.

After the password is obtained in accordance with the authentication method, the authentication unit 230 in the service providing apparatus 300 performs password authentication (S37) in accordance with the user ID included in the authentication response received in step S31 and the password or password authentication information obtained in step S36. More specifically, the authentication unit 230 searches the user information database held in the authentication information management unit 340 in accordance with the user ID and identifies the entry of the corresponding user. Authentication is conducted by collating the password included in the entry with the password or password authentication information obtained in step S36. After the authentication process of step S37 is completed, the authorization process of step S34 is executed. Step S34 and subsequent steps are the same as in the first embodiment.

In the user authentication system of the second embodiment, the authentication unit 230 in the service providing apparatus 300 has the authentication information conversion unit 350 convert an authentication response depending on the authentication method to a pair of the user ID and the password or password authentication information. The authentication unit 230 performs password authentication by using the pair and the user information database held in the authentication information management unit 340. The user information database is based on the conventional password authentication. The effect of the present invention is produced by adding the conversion information database in the authentication information conversion unit 350 to the user information database.

With the structure described above, a service providing apparatus based on the conventional password authentication can be improved to a stronger user authentication system with a consent confirmation function by making a few modifications. The system allows one of a plurality of authentication methods to be selected easily in accordance with the authentication request different for each service to be provided. Because the difference in authentication method is separated from the service, service development is facilitated. The structure of the second embodiment is obtained by placing an additional conversion database in the service providing apparatus 300, not by placing a proxy authentication feature outside the service providing apparatus as done in the related art. This avoids problems related to the isolation of the service providing apparatus and the proxy authentication feature. These problems include the difficulty in negotiation of the authentication method based on the authentication policy depending on the service to be provided, the difficulty in user authentication based on the result of server authentication with respect to the service providing apparatus, and the need for a separate procedure for exchanging information securely between the service providing apparatus and the proxy authentication feature. Therefore, flexible user authentication with easily switchable authentication methods can be implemented.

Third Embodiment

Figure 16:
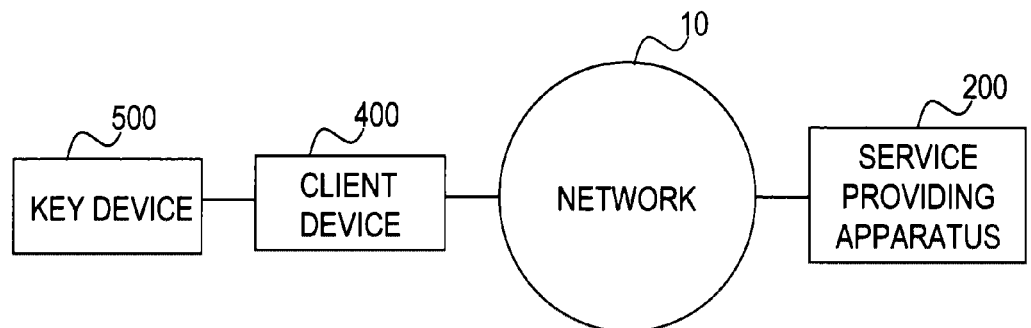
FIG. 16 is a diagram showing an outlined structure of a user authentication system of a third embodiment.

FIG. 16 shows the structure of a user authentication system of a third embodiment. A client device 400 and a service providing apparatus 200 are connected via a network 10 in such a manner that they can communicate with each other. The client device 400 and a key device 500 are connected in such a manner that they can communicate with each other.

The key device 500 provides a user authentication function for the client device 400. To be more specific, the key device 500 includes elements concerning user authentication that have been extracted and isolated from the client device 100 of the first embodiment. A combination of the key device 500 and the client device 400 has the same functions as the client device 100.

The structure is formed to share authentication settings by using a common key device 500 if a plurality of client devices 400 are used and to maintain the continuation of service even after the client device 400 is changed. For example, the key device 500 may be a mobile phone, and the client device 400 may be a PC or the like.

Figure 17:
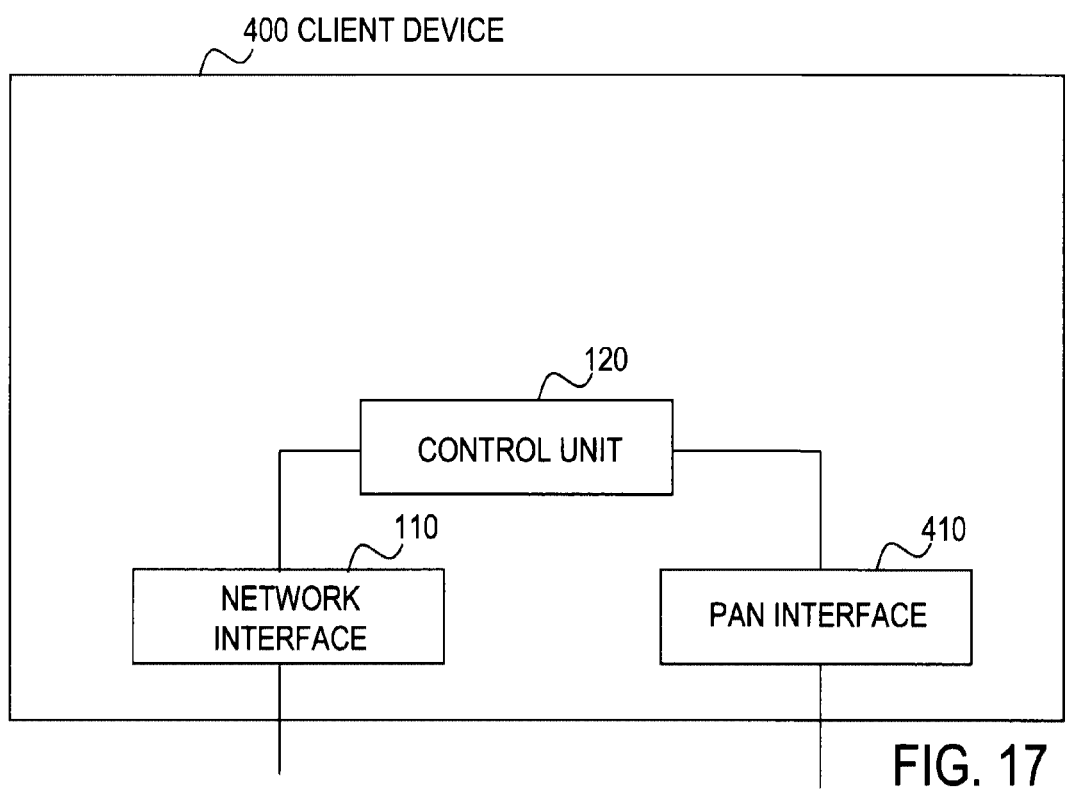
FIG. 17 is a diagram showing the structure of a client device of the third embodiment.

FIG. 17 shows an example structure of the client device 400 of the third embodiment. Like the client device 100, the client device 400 includes a network interface 110 and a control unit 120. In addition, a personal area network (PAN) interface 410 is provided to communicate with the key device 500. PANs use wireless connections such as Bluetooth and Ultra Wide Band (UWB), infrared connections such as IrDA, and wired connections such as USB.

Figures 18, 19:
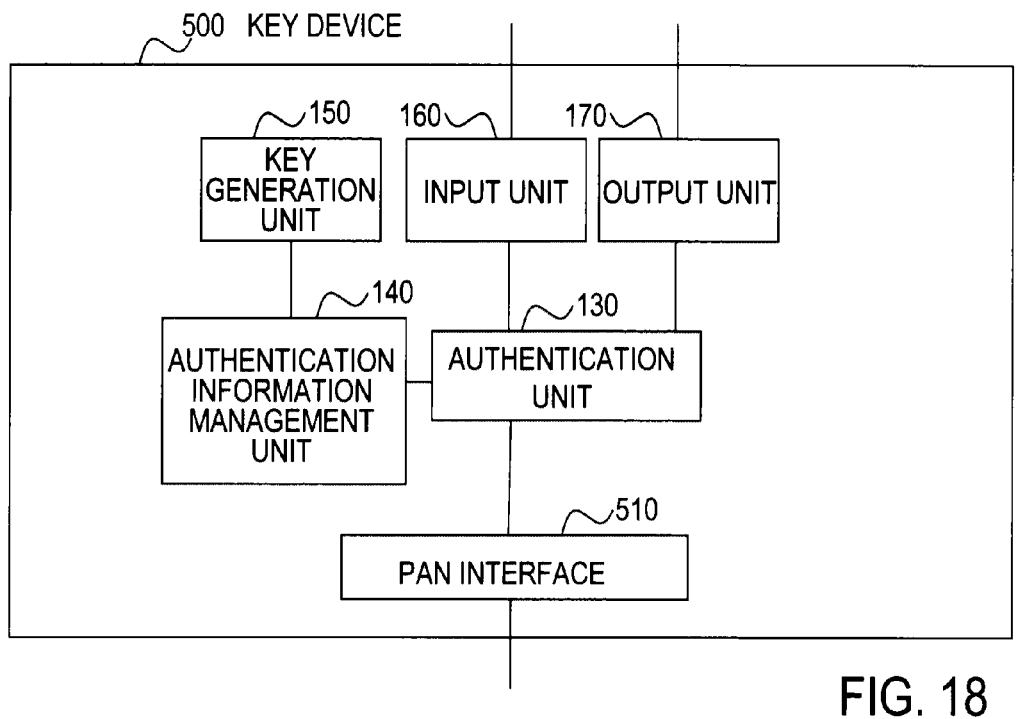
FIG. 18 is a diagram showing the structure of a key device of the third embodiment.
FIG. 19 is a diagram showing the format of a service information database in the key device of the third embodiment.

FIG. 18 shows the structure of the key device 500 in the third embodiment. Like the client device 100, the key device 500 includes an authentication unit 130, an authentication information management unit 140, a key generation unit 150, an input unit 160, and an output unit 170. In addition, a PAN interface 510 is provided to communicate with the client device 400.

FIG. 19 shows the format of the service information database held by the authentication information management unit 140 of the key device 500. The database differs from the service information database shown in FIG. 4 in that a password column (a fifth column) is added. If the service providing apparatus 200 allows the key device 500 to store a user password, the column is used to store the password for using a particular service in association with the service. The password stored in association with the service saves the user from inputting the password and provides improved convenience.

User Registration

Figure 20:
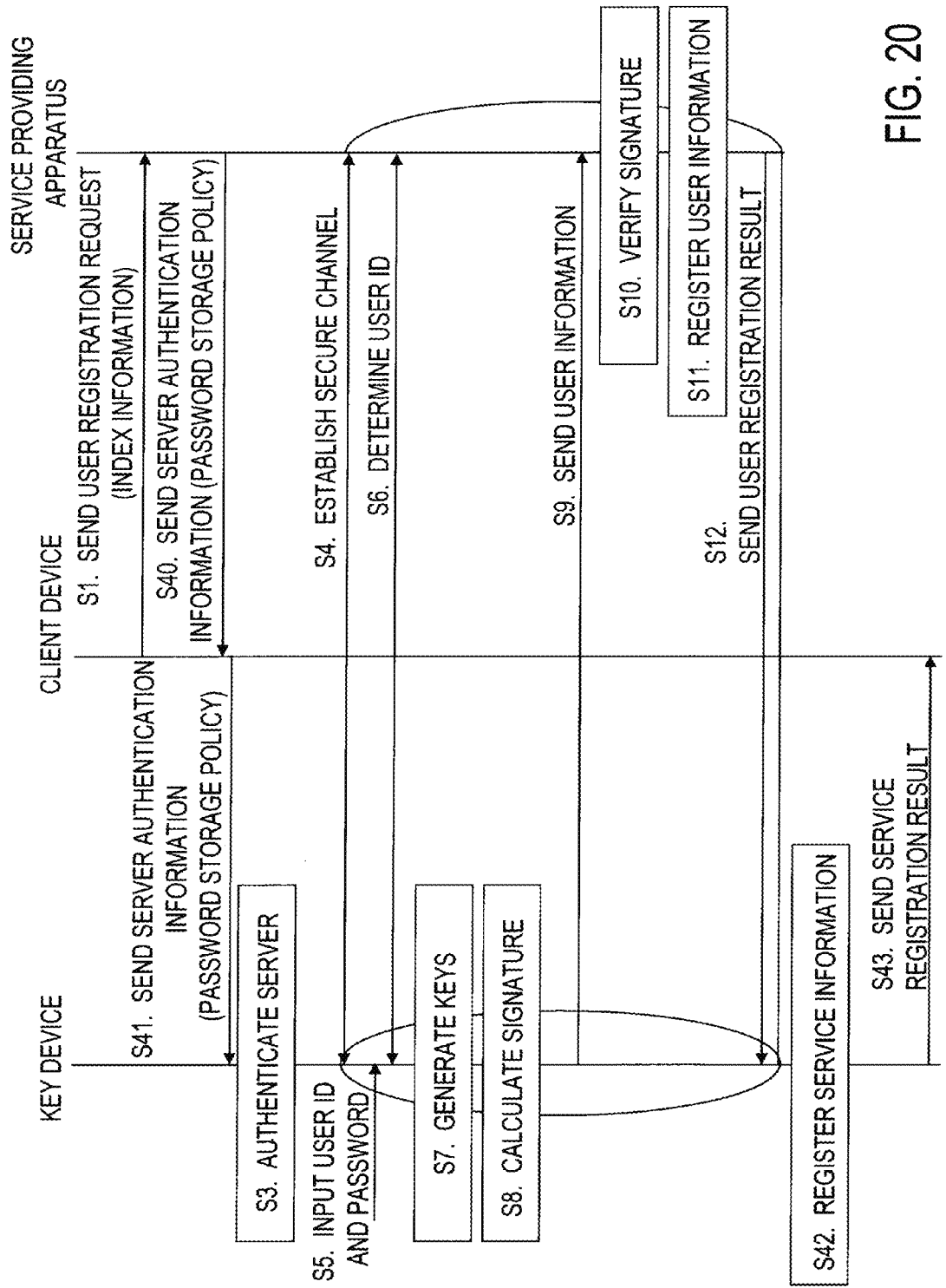
FIG. 20 is a flowchart showing the flow of a user registration process in the user authentication system of the third embodiment.

FIG. 20 shows the flow of a user registration process in the user authentication system of the third embodiment. The service providing apparatus 200 places a password storage policy in server authentication information and sends it to the client device 400 (S40). The server authentication information is the same as that sent in step S2 of the first embodiment, except that the password storage policy is included. The password storage policy is a flag representing whether the key device 500 is allowed to store a user password. If the flag says Yes, the key device 500 can store a user password. If the flag says No, the key device 500 is not allowed to store a user password. Then, the user has to input his or her password each time authentication is performed for the service to be used.

If it is determined that the server authentication information has been received, the control unit 120 in the client device 400 sends the received server authentication information through the PAN interface 410 to the key device 500 (S41).

Upon receiving the server authentication information, the key device 500 executes steps S3 to S8 and step S12, like the client device 100 of the first embodiment.

Then, if it is confirmed in step S42 that the password storage policy included in the server authentication information received in step S41 is Yes, the key device 500 adds the server certificate, user ID, public key, private key, and password as a single entry in the service information database. If the password storage policy received in step S41 is No, the key device 500 adds the entry where the password is replaced by a symbol representing that no password is stored (such as "-") (S42). Next, the key device 500 has the PAN interface 510 send the result of service registration to the client device 400 (S43).

User Authentication

Figure 21:
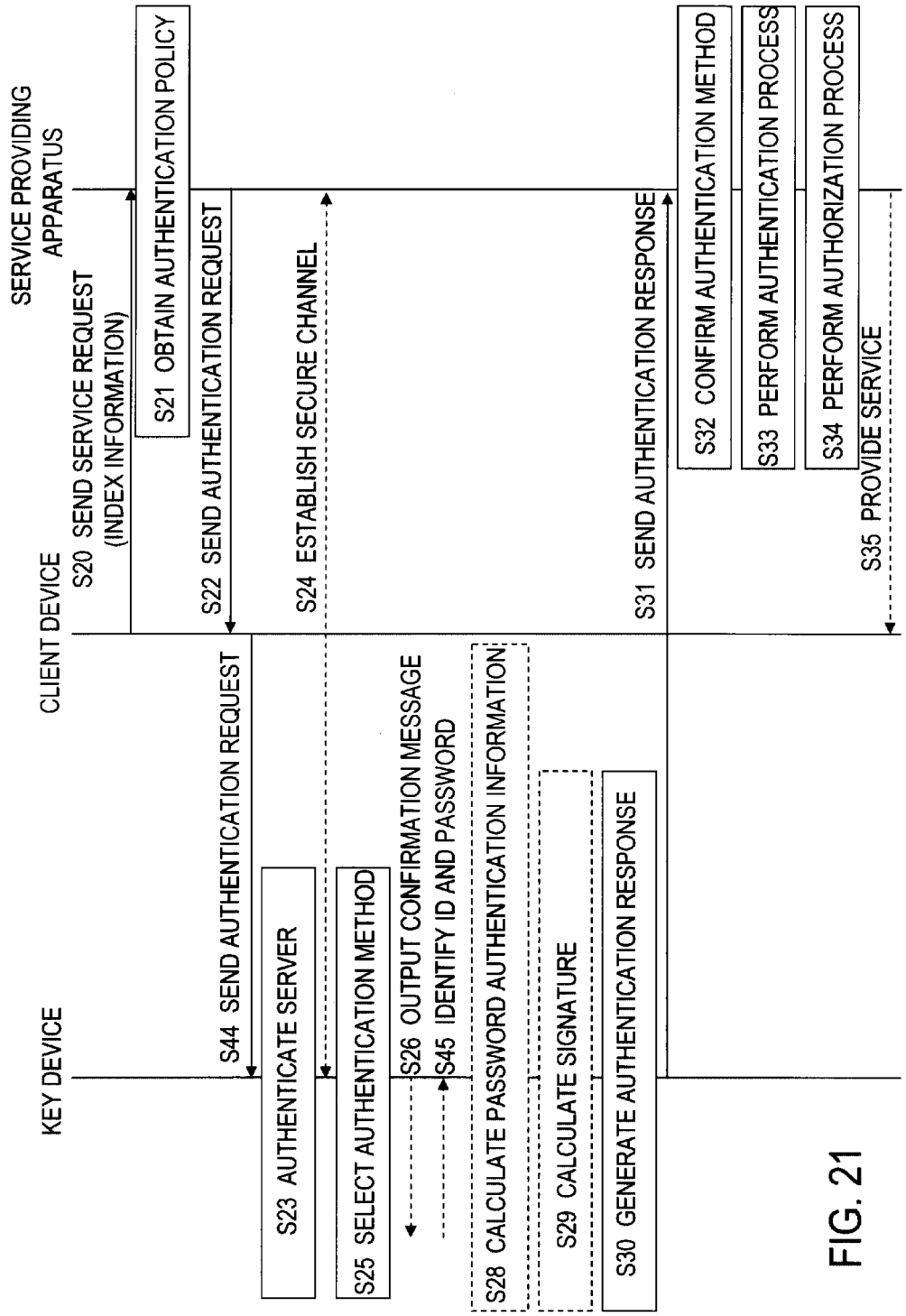
FIG. 21 is a flowchart showing the flow of a user authentication process in the user authentication system of the third embodiment.

FIG. 21 shows the flow of a user authentication process in the user authentication system of the third embodiment. In the client device 400, which receives an authentication request from the service providing apparatus 200 in step S22, if the control unit 120 judges that the authentication request has been received, the PAN interface 410 sends the received authentication request to the key device 500 (S44). Upon receiving the authentication request, the key device 500 executes steps S23 to S26, like the client device 100 of the first embodiment.

If an ID and password are necessary, the key device 500 searches the service information database held in the authentication information management unit 140 in accordance with the server certificate, and identifies the entry corresponding to the service. If the identified entry has a value in the password field, the value is obtained as the password (S45). The value in the user ID field is obtained as the user ID (S45). If no value is stored in the password field of the identified entry, the input unit 160 receives a user ID and password (S45), as in step S27 of the first embodiment. Then, steps S28 to S31 are executed, in the same way as in the client device 100 of the first embodiment.

In the user authentication system of the third embodiment, user authentication is performed not by the client device 400 but by the key device 500. If a plurality of client devices 400 are included, the authentication settings can be shared by a single key device 500. The plurality of client devices 400 do not require separate authentication settings. This improves the convenience. When the client device 400 is replaced, the transition can be made easily.

If the client device 100 of the first embodiment is formed by an open platform such as a PC, a browser or middleware program that inputs the password may be active. The system is convenient because the user can skip inputting the password. This, however, can lower the level of security for the service providing apparatus 200 that is expecting for the password to be input by the user.

In the user authentication system of the third embodiment, whereas the client device 400 is formed by an open platform, the key device 500, which performs authentication, can be formed as a closed platform. With this structure, whereas the client device 400 is used for various purposes, the key device 500 can force the password storage policy. More specifically, the key device 500 can enable or disable password storage in accordance with the password storage policy sent in step S40.

Fourth Embodiment

In a fourth embodiment, the selection of authentication methods in the first embodiment is specified in detail. The structure of a user authentication system of the fourth embodiment is the same as that in the first embodiment (FIG. 1). The client device 100 and the service providing apparatus 200 have the same structures as in the first embodiment (FIGS. 2 and 3).

FIG. 22A shows an authentication method correspondence table stored in the authentication unit 130 of the client device 100. The authentication method correspondence table shows the correspondence between required authentication levels and specific authentication methods to be used.

A row represents a level of consent confirmation. The second row corresponds to level-zero consent confirmation. The level-zero consent confirmation means that no consent confirmation is required in authentication. The third row corresponds to level-one consent confirmation. The level-one consent confirmation means that consent confirmation is required in authentication. A column represents a level of authentication strength. A second column corresponds to level-zero strength. The level-zero strength means that low-strength authentication is necessary. A third column corresponds to level-one strength. The level-one strength means that intermediate-strength authentication is necessary. A fourth column corresponds to level-two strength. The level-two strength means that high-strength authentication is necessary.

A combination of a required authentication strength level S and a consent confirmation level C, <S, C>, will be referred to as an authentication policy. For example, <1, 0> means that an authentication method of strength level 1 or higher and consent confirmation level 0 or higher is required. The elements in the table listing combinations of authentication strength levels and consent confirmation levels (authentication policies) represent corresponding authentication methods. The elements mean the following.

NA (no action) means that a user authentication action is not necessary, such as when the user ID is reported. OK means that a simple action such as clicking the OK button is required. PK represents authentication based on a public key. PW represents authentication based on a password. PKPW represents an authentication method using a combination of a public key and a password.

For example, an authentication policy <1, 0> corresponds to three authentication methods, PK, PW, and PKPW. As clearly indicated by the properties, the policies have a partially ordered lattice structure. For example, an authentication method X satisfying a policy P1=<S1, C1> also satisfies a policy P2=<S2, C2> when P2≦P1 (both S2≦S1 and C2≦C1). As the table shows, NA satisfies <0, 0>, OK satisfies <0, 1>, PW satisfies <1, 1>, PK satisfies <2, 0>, and PKPW satisfies <2, 1>.

User Registration

The flow of a user registration process in the user authentication system of the fourth embodiment is the same as that in the first embodiment (FIG. 6).

User Authentication

FIG. 8 shows the flow of the user authentication process in the user authentication system of the fourth embodiment. The authentication policy included in the authentication request made in step S22 has the format as described above. In other words, the policy is represented by a pair <S, C>, where S is the required level of authentication strength and C is the required level of consent confirmation. The authentication policies of the fourth embodiment are also stored based on service in the service providing unit 220 of the service providing apparatus 200. Steps S23 and S24 are the same as those in the first embodiment.

In step S25, authentication is selected as follows. If the authentication method correspondence table stored in the authentication unit 130 of the client device 100 is as shown in FIG. 22A and if the authentication policy which the client device 100 receives from the service providing apparatus 200 in step S22 is <1, 0>, for instance, applicable authentication methods are PK, PW, and PKPW. Then, the user could select PK according to his or her preference, for example. If the authentication policy is <2, 0>, applicable authentication methods are PK and PKPW, and PK would be selected because of its simplicity, for example.

If the client device 100 does not support the PK authentication method, the authentication method correspondence table can be as shown in FIG. 22B, for example. If the authentication policy received by the client device 100 is <1, 0>, just the PW authentication method is applicable, and PW is selected. If the authentication policy is <2, 0>, just the PW authentication method is applicable again, and PW is selected. In the latter case, the service providing apparatus 200 finds in step S32 that the PW authentication method does not satisfy the authentication policy <2, 0>. If this occurs, the service providing apparatus 200 just needs to limit services that can be authorized.

By giving flexibility to the authentication policy sent from the service providing apparatus 200 to the client device 100, as described above, the client device 100 is allowed to select an authentication method with flexibility. For example, authentication can satisfy an authentication method supported by the client device 100, and an authentication method with strength greater than the required level can be selected. In the fourth embodiment, levels of authentication strength and consent confirmation are used as elements concerning the authentication policy, but other elements can be used. For example, the presence or absence of biometric authentication information, the presence or absence of a nonrepudiation rule, and other elements can be added.

Modification of Fourth Embodiment

In the present modification, a step of sending a request from the client device 100 beforehand at service registration is added for the selection of an authentication policy to be sent from the service providing apparatus 200 to the client device 100.

The structure of a user authentication system of the present modification is the same as that in the first embodiment (FIG. 1). The structures of the client device 100 and the service providing apparatus 200 are the same as those in the first embodiment (FIGS. 2 and 3). The flow of a user registration process in the user authentication system of the modification is also the same as that in the first embodiment (FIG. 6).

FIG. 23 shows user information sent from the client device 100 to the service providing apparatus 200 in step S9. The shown user information differs from the user information of the first embodiment shown in FIG. 7 in that a user policy has been added. The user policy is a request made from the user, and it determines the authentication policy to be included in the authentication request sent from the service providing apparatus to the client device when the service is used. The authentication policy is calculated from the user policy and the service policy determined in advance for each service to be provided by the service providing apparatus, and the calculation procedure will be described later.

FIG. 24A shows an example of the user policy. The third column in the second row in FIG. 24A has <2, 0>. In the figure, the position of the third column in the second row represents a service policy of <1, 0> (level-one authentication strength and level-zero consent confirmation). This is interpreted as a user policy that wants to use an authentication policy of <2, 0> if a certain service has a service policy of <1, 0>. As shown in the figure, the authentication policy specifies level-two authentication strength in all cases (all the corresponding service policies). The user policy is specified as a policy-to-policy conversion rule.

In the example described above, the user policy requires a tighter authentication policy than the service policy. This style is effective if the client device 100 can always use a PK authentication method having level-two strength and if the user does not want authentication with an authentication method having level-one strength or lower. The reason for this type of user requirement is that if the service providing apparatus and the client device agree to use a low-strength authentication method, risk of impersonation by a third party becomes higher.

FIG. 24B shows another example of the user policy. This policy would be used if the client device 100 can always use PW, which satisfies a policy of <1, 1> or below. If the service policy is <0, 1>, the authentication policy is converted to <1, 1>, so that the PW authentication method is accepted. However, if the service policy is <1, 0>, the authentication policy is converted to <2, 0>, so that PK, which is easier to use than PW, is accepted.

The service providing apparatus 200 receives user information from the client device 100 in step S9 and proceeds to steps S10 and S11 as in the first embodiment (FIG. 6). FIG. 25 shows the format of a user information database held in the authentication information management unit 240 of the service providing apparatus 200. Each row corresponds to a single user.

This format differs from the format of the user information database in the first embodiment shown in FIG. 5 in that a user policy is added.

User Authentication

Figure 26:
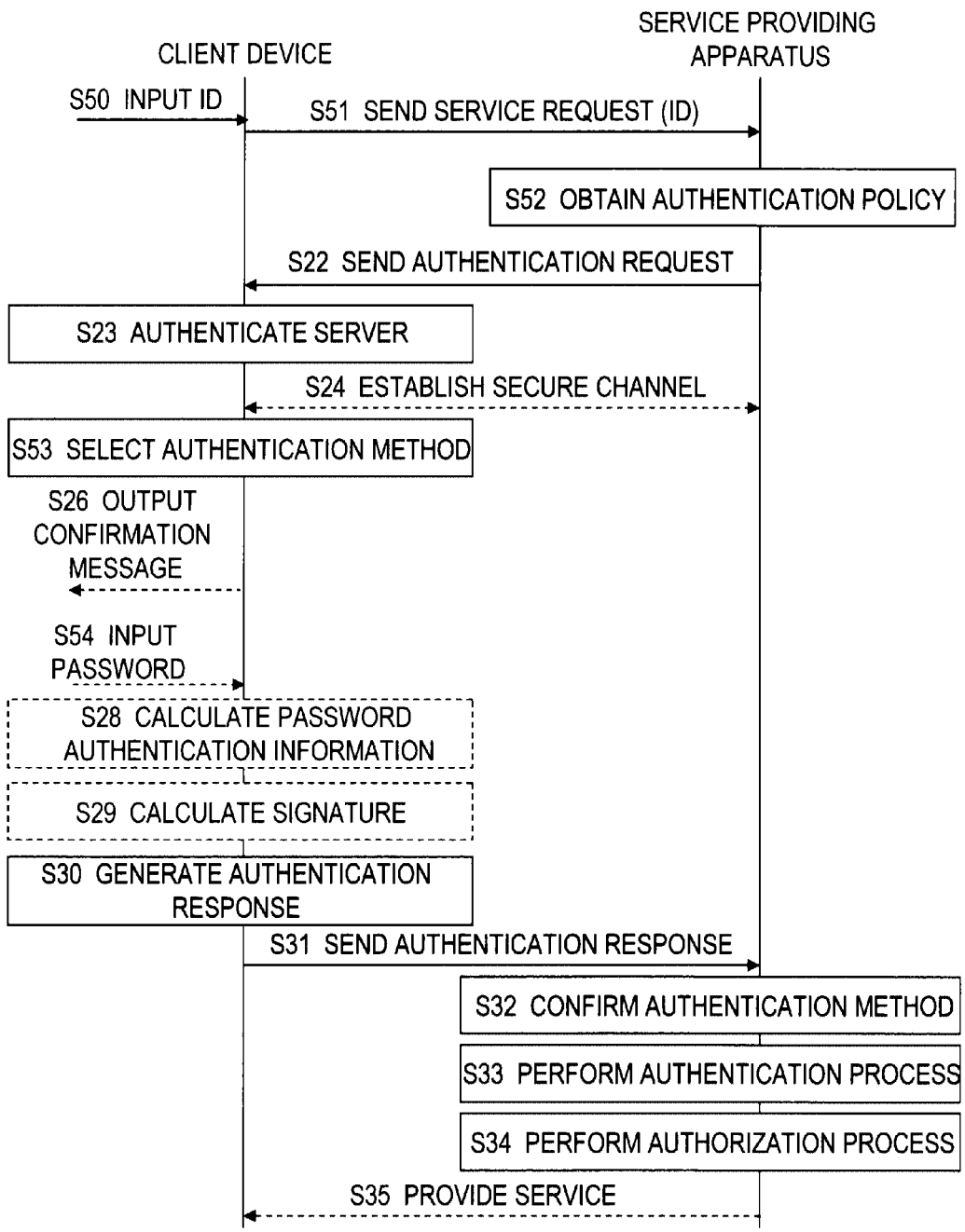
FIG. 26 is a flowchart showing the flow of a user authentication process in a user authentication system of the modification of the fourth embodiment.

FIG. 26 shows the flow of a user authentication process in the user authentication system of the present modification. The input unit 160 in the client device 100 receives a user ID (S50). The control unit 120 in the client device 100 sends a service request to the service providing apparatus 200 through the network interface 110 (S51). The service request includes the user ID input in step S50.

Upon receiving the service request, the service providing apparatus 200 searches the user information database held in the authentication information management unit 240 in accordance with the user ID included in the service request, and identifies the entry of the corresponding user. The service providing apparatus 200 further references the user policy field in the identified entry and obtains the user policy. At the same time, the requested service is identified in accordance with the index information included in the service request, and the service policy concerning the service is obtained. The service providing apparatus 200 then determines the authentication policy based on the obtained service policy and the user policy (S52).

For example, if the user policy is as shown in FIG. 24B and if the service policy is <0, 1>, the location corresponding to the policy <0, 1>, which is the second column in the third row, is referenced in FIG. 24B, and an authentication policy of <1, 1> is obtained. If the service policy is <1, 0>, an authentication policy of <2, 0> is obtained.

The service providing apparatus 200 sends an authentication request that includes the determined authentication policy to the client device 100 (S22). Steps S23 and S24 are the same as those in the first embodiment.

As in the fourth embodiment, the client device 100 next selects an authentication method (S53). If the authentication request sent from the service providing apparatus 200 in step S22 includes a confirmation message, the output unit 170 in the client device 100 outputs the confirmation message to the user, as in the first embodiment (S26). If necessary, the input unit 160 receives a password (S54). The subsequent steps are the same as those in the first embodiment (FIG. 8).

Since the client device 100 sends a user policy to the service providing apparatus 200 at registration, the authentication policy can be controlled from the user side. This style is effective if the client device 100 always supports the PK authentication method and if the user wants the PK authentication method or higher. This allows the user to make a request to prevent the security from being lowered by accepting a low-level authentication method.

Fifth Embodiment

A fifth embodiment is a system when the user authentication system in the first embodiment is applied to a web application. To be more specific, the system is implemented by using the FORM element of HTML. FIG. 27 shows the format of a message sent in user authentication in the user authentication system of the fifth embodiment.

FIG. 27A shows a service request message sent in step S20 in FIG. 8. The /form.html string specifies a requested service and the format of the authentication request message returned in step S22. FIG. 27B shows the format of the authentication request message sent in step S22 in FIG. 8. The <auth . . . > string in the sixth line is an extended tag. Upon receiving the tag, the authentication unit 130 in the client device 100 executes steps S23 to S29 in accordance with the selected authentication method. When the user clicks the authentication button, the authentication unit 130 generates an authentication response shown in FIG. 27C (S31). The client device 100 sends the authentication response to the service providing apparatus 200 (S32). Upon receiving the authentication response, the service providing apparatus 200 invokes authenticate.cgi specified in the first line of the authentication response shown in FIG. 27C to execute step S32 and the subsequent steps.

Modification of Fifth Embodiment

FIG. 28 shows the data format of an authentication request in a user authentication system in a modification of the fifth embodiment. FIG. 29 shows an authentication script in the user authentication system in the modification of the fifth embodiment. In the modification of the embodiment, the authentication request message sent from the service providing apparatus 200 to the client device 100 in step S22 takes the format shown in FIG. 28, not the format shown in FIG. 27B. In this format, information included in the authentication request is written with the input tag. The authentication process performed in steps S23 to S29 in accordance with the authentication method is executing the authentication script authScript.js specified in the fourth line in FIG. 28. The script is stored in the authentication unit 130 of the client device 100. FIG. 29 shows the contents of the authentication script.

With the user authentication procedure described above, the user authentication system of the present invention can be applied to a web application. The system using extension tags is more secure because the client device 100 does not have to execute the authentication script. The system using the authentication script can be implemented easily without adding a function for the authentication tag or the like to the client device 100.

Sixth Embodiment

Figures 30, 31:
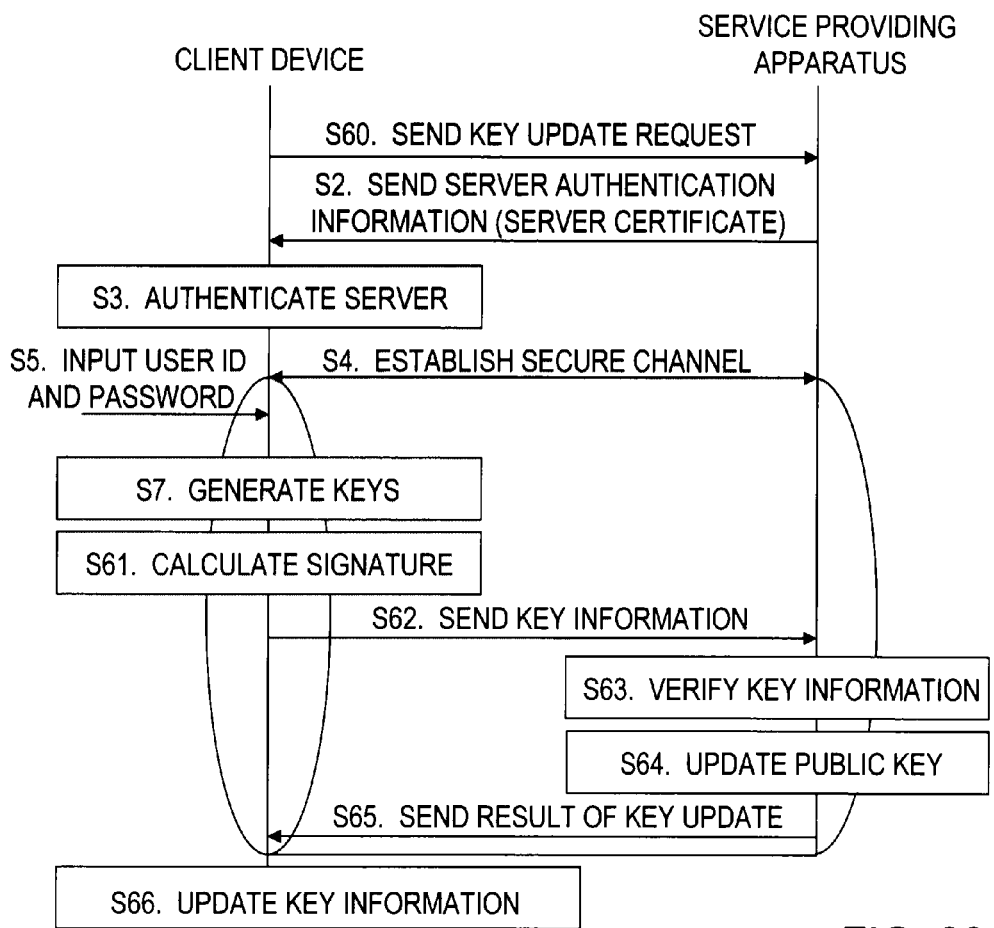
FIG. 30 is a flowchart showing the flow of a key update process in a user authentication system of a sixth embodiment.
FIG. 31 illustrates details of key information in the sixth embodiment.

Described as a sixth embodiment is a procedure for updating the public key in the user information recorded in the authentication information management unit 240 of the service providing apparatus 200. A user authentication system of the sixth embodiment has the same structure as in the first embodiment (FIG. 1). The client device 100 and the service providing apparatus 200 have the same structures as in the first embodiment (FIGS. 2 and 3). FIG. 30 shows the flow of a public key update process in the user authentication system of the sixth embodiment.

The control unit 120 in the client device 100 sends a key update request to the service providing apparatus 200 through the network interface 110 (S60). Steps S2 to S7 are the same as those in the user registration process in the first embodiment (FIG. 6). The user registration process in the first embodiment has a step of determining a user ID (S6). The sixth embodiment, however, does not have the step of determining the user ID (S6), because just the public key in the user information is updated (the user ID has already been determined). Then, a new pair of a public key and a private key is generated (S7) (the keys will be referred to as a public key 2 and a private key 2).

After step S7, the client device 100 calculates key information necessary for user registration (S61). The key information includes a user ID, a password or password authentication information, the public key 2, a time stamp, and signature 3 calculated by using the private key 2 for the target items of signature, including the three elements, and signature 4 calculated by using an old private key for the information including the above target items of signature and signature 3 (FIG. 31). The key information may include the term of validity of the public key 2. If the term of validity of the public key is registered, any expired public key can be erased automatically. Either the password or signature 4 may be omitted from the key information. The control unit 120 in the client device 100 sends the key information to the service providing apparatus 200 through the network interface 110 (S62).

Upon receiving the key information, the service providing apparatus 200 has the authentication unit 230 verify the validity of the key information (S63). To be more specific, the authentication unit 230 searches, in accordance with the user ID included in the key information, through the user information database of the authentication information management unit 240 in the service providing apparatus 200 and identifies the entry of the corresponding user. The password is obtained from the user entry, and it is checked whether the password matches the password or password authentication information included in the key information. The public key is also obtained from the entry, and signature 4 included in the key information is verified with the public key. Further, signature 3 included in the key information is verified by using the public key 2 included in the key information, and it is checked that the time stamp included in the key information is appropriate.

If the validity of key information is verified successfully in step S63, the authentication information management unit 240 in the service providing apparatus 200 updates the public key in the entry of the identified user to the public key 2 included in the key information (S64). The service providing apparatus 200 sends "OK" as the result of key update through the network interface 210 to the client device 100 (S65). If the verification of the validity of the key information fails (S63), the service providing apparatus 200 sends "failure" as the result of key update to the client device 100 (S65).

If the result of key update is "OK", the authentication information management unit 140 in the client device 100 updates the public key in the service information (information associating the user ID, public key, and private key to the server certificate received in step S2) to the public key 2, newly generated (S66). If the result of key update is "failure", the client device 100 terminates the key update process.

With the process described above, the public key in the user information registered in the user registration process in the first embodiment can be updated. As described above, in the sixth embodiment, the public key is updated after mutual authentication is conducted between the client device and the service providing apparatus. Therefore, it is difficult for a fraudulent user pretending to be an authorized user to update the public key, and the public key can be updated securely.

Seventh Embodiment

Figure 32:
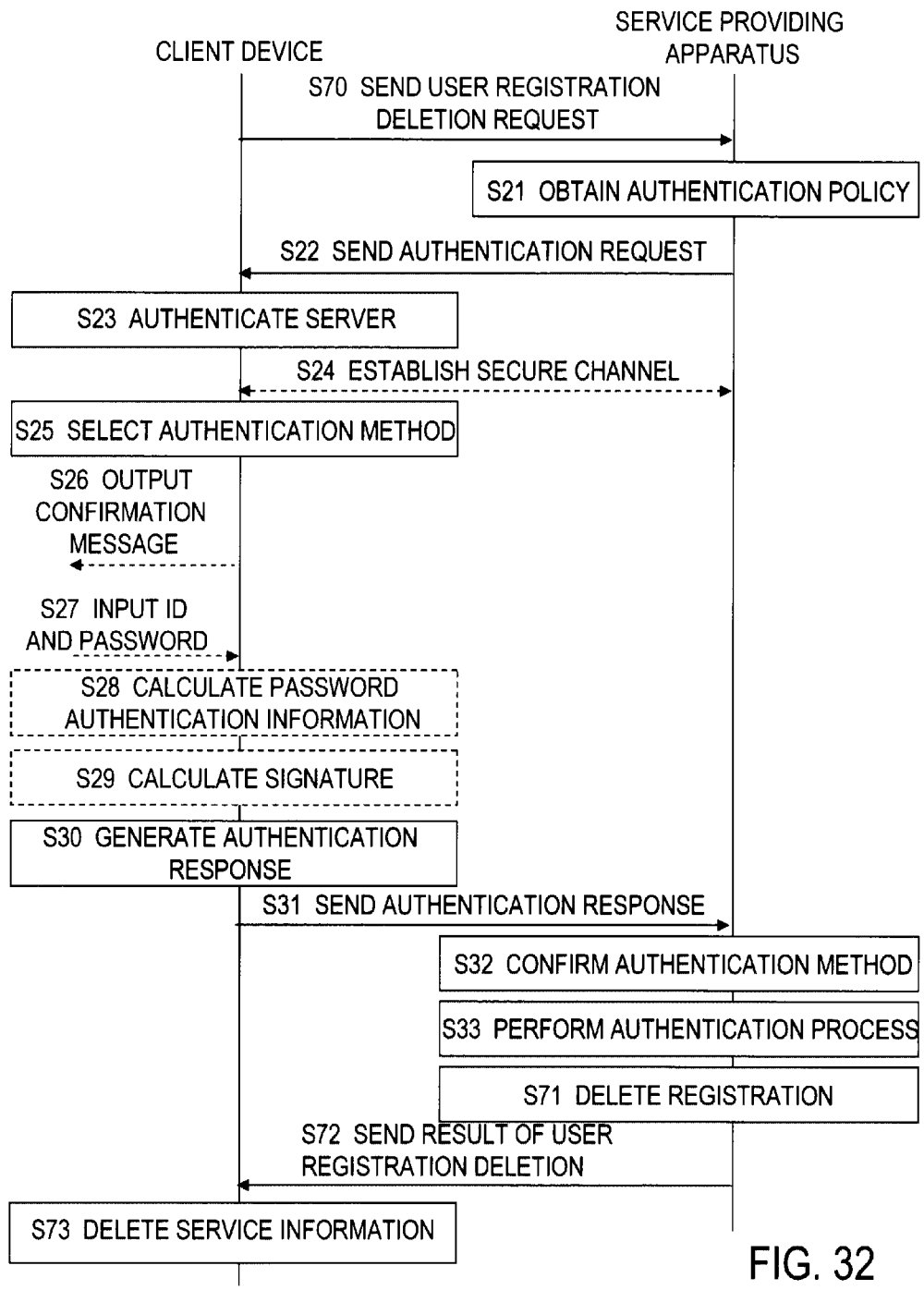
FIG. 32 is a flowchart showing the flow of a registration deletion process in a user authentication system of a seventh embodiment.

Described as a seventh embodiment is a procedure for erasing the user information recorded by the authentication information management unit 240 in the service providing apparatus 200. The structure of a user authentication system of the seventh embodiment is the same as that in the first embodiment (FIG. 1). The client device 100 and the service providing apparatus 200 have the same structures as in the first embodiment (FIGS. 2 and 3). FIG. 32 shows the flow of a user registration deletion process in the user authentication system of the seventh embodiment.

The control unit 120 in the client device 100 sends a user registration deletion request through the network interface 110 to the service providing apparatus 200 (S70). Steps S21 to S33 are the same as those in the user authentication process (FIG. 8) in the first embodiment.

If the authentication response of each authentication method is verified successfully (S33), the authentication information management unit 240 in the service providing apparatus 200 deletes the user information identified by the user ID included in the authentication response (successfully authenticated user ID), from the user information database (S71). If authentication and registration deletion succeed, the service providing apparatus 200 sends "OK" as a result of user registration deletion to the client device 100 (S72). If authentication or registration deletion fails, the service providing apparatus 200 sends "failure" as the result of user registration deletion to the client device 100 (S72).

If the result of user registration deletion is "OK", the authentication information management unit 140 in the client device 100 deletes the service information from the service information database (S73). If the result of user registration deletion is "failure", the client device 100 terminates the user registration deletion process. In the seventh embodiment, user registration is deleted after mutual authentication is conducted between the client device and the service providing apparatus, as described earlier. This makes it difficult for a fraudulent user pretending to be an authorized user to delete the user registration, and it becomes also difficult for a fraudulent service providing apparatus to obtain a user registration deletion request in an unauthorized manner. Therefore, the user registration can be deleted securely.

The embodiments described above produce a function of a self-signed certificate by signing the user information by using a private key of the client device. In addition, a certificate of a key pair stored in the client device, issued by a reliable third party, may be sent to the service providing apparatus, together with the user information. This allows a guarantee from the third party to be added to the information given by the user, and the user can be identified in case of any dispute arising between the user and a service provider.

The client device and the service providing apparatus described above may be implemented by programs describing the corresponding functions: The programs may be recorded on a computer-readable recording medium, read into a computer, and executed. The computer-readable recording medium may be a recording medium such as a flexible disk, a magneto-optical disk, a CD-ROM, or a flash memory, or a storage such as a hard disk drive incorporated in a computer system. The computer-readable recording medium may hold the programs dynamically for a short period, as when the programs are sent via the Internet (transmission medium or transmitted wave), and may hold the programs for a certain period of time, like a volatile memory in a computer used as a server.

What is claimed is:

1. A client device connected through a network to a service providing apparatus, the client device comprising:
a micro-processor or CPU;
a client authentication information management unit in the micro-processor or CPU that holds a service information database storing a user ID, a public key, a private key, and a server certificate in association with each service;
a control unit in the micro-processor or CPU;
a client authentication unit in the micro-processor or CPU; and
a key generation unit in the micro-processor or CPU;
wherein the control unit has a request function to send a user registration request and a service request to the service providing apparatus;
the client authentication unit has a server authentication function to verify server authentication information and an authentication request sent from the service providing apparatus;
the client authentication unit has a user information transmission function to obtain a signature for a user ID, a password, a user attribute, and a public key generated by the key generation unit, by using a private key generated corresponding to the public key in the key generation unit, and to send to the service providing apparatus user information that includes the user ID, the password, the user attribute, the public key, and the signature;
the client authentication information management unit has a service information registration function to register service information that includes the user ID, the public key, the private key, and a server certificate, in the service information database; and
the client authentication unit has an authentication response function to calculate, if an authentication method identified from an authentication policy included in the authentication request sent from the service providing apparatus is password authentication, password authentication information with which the possession of the password can be confirmed, from the password, and to send an authentication response that includes the password authentication information, the authentication method, and the user ID to the service providing apparatus; to calculate, if the authentication method identified from the authentication policy is public key authentication, a signature 1 for the authentication method, the user ID, and a challenge included in the authentication request, and to send an authentication response that includes the signature 1, the authentication method, and the user ID to the service providing apparatus; and to calculate, if the authentication method identified from the authentication policy is public-key-and-password combination authentication, a signature 2 for the authentication method, the user ID, the challenge included in the authentication request, and the password, and to send an authentication response that includes the signature 2, the authentication method, and the user ID to the service providing apparatus.

2. A key device connected to a client device connected through a network to a service providing apparatus, the key device comprising:
a micro-processor or CPU;
a client authentication information management unit in the micro-processor or CPU that holds a service information database storing a user ID, a public key, a private key, and a server certificate in association with each service;
a client authentication unit in the micro-processor or CPU; and
a key generation unit in the micro-processor or CPU;
wherein the client authentication unit has a server authentication function to verify server authentication information and an authentication request sent from the service providing apparatus;
the client authentication unit has a user information transmission function to obtain a signature for a user ID, a password, a user attribute, and a public key generated by the key generation unit, by using a private key generated corresponding to the public key in the key generation unit, and to send to the service providing apparatus user information that includes the user ID, the password, the user attribute, the public key, and the signature;
the client authentication unit has an authentication response function to calculate, if an authentication method identified from an authentication policy included in the authentication request sent from the service providing apparatus is password authentication, password authentication information with which the possession of the password can be confirmed, from the password, and to send an authentication response that includes the password authentication information, the authentication method, and the user ID to the service providing apparatus; to calculate, if the authentication method identified from the authentication policy is public key authentication, a signature 1 for the authentication method, the user ID, and a challenge included in the authentication request, and to send an authentication response that includes the signature 1, the authentication method, and the user ID to the service providing apparatus; and to calculate, if the authentication method identified from the authentication policy is public-key-and-password combination authentication, a signature 2 for the authentication method, the user ID, the challenge included in the authentication request, and the password, and to send an authentication response that includes the signature 2, the authentication method, and the user ID to the service providing apparatus; and
the client authentication information management unit has a service information registration function to register service information that includes the user ID, the public key, the private key, and a server certificate, in the service information database.

3. The client device according to claim 1,
wherein the client authentication unit stores an authentication method correspondence table that includes an authentication method registered for each authentication policy made up of a combination of a degree of authentication strength and a level of consent confirmation; and
in the authentication response function, the client authentication unit reads from the authentication method correspondence table all authentication methods corresponding to the authentication policy included in the authentication request sent from the service providing apparatus, and specifies a user-selected authentication method or an executable authentication method among all the authentication methods as the authentication method identified from the authentication policy.

4. The key device according to claim 2,
wherein the client authentication unit stores an authentication method correspondence table that includes an authentication method registered for each authentication policy made up of a combination of a degree of authentication strength and a level of consent confirmation; and in the authentication response function, the client authentication unit reads from the authentication method correspondence table all authentication methods corresponding to the authentication policy included in the authentication request sent from the service providing apparatus, and specifies a user-selected authentication method or an executable authentication method among all the authentication methods as the authentication method identified from the authentication policy.

5. The client device according to claim 3, wherein, in the user information transmission function, the client authentication unit obtains a signature for a user policy serving as a user-requested authentication policy, the user ID, the password, the user attribute, and the public key generated by the key generation unit, by using the private key generated corresponding to the public key in the key generation unit, and sends user information that includes the user policy, the user ID, the password, the user attribute, the public key, and the signature to the service providing apparatus.

6. The key device according to claim 4, wherein, in the user information transmission function, the client authentication unit obtains a signature for a user policy serving as a user-requested authentication policy, the user ID, the password, the user attribute, and the public key generated by the key generation unit, by using the private key generated corresponding to the public key in the key generation unit, and sends user information that includes the user policy, the user ID, the password, the user attribute, the public key, and the signature to the service providing apparatus.

7. A service providing apparatus connected through a network to a client device, the service providing apparatus comprising:

a micro-processor or CPU;

a service-providing-apparatus authentication information management unit in the micro-processor or CPU that holds a user information database storing a user ID, a password, a user attribute, and a public key in association with each user;

a service providing unit in the micro-processor or CPU; and a service-providing-apparatus authentication unit in the micro-processor or CPU;

wherein the service-providing-apparatus authentication unit has a registration request response function to send server authentication information that includes a server certificate and a signature to the client device in response to a user registration request sent from the client device;

the service-providing-apparatus authentication unit has a user registration function to receive user information from the client device, to verify a signature, and, if the verification is successful, and to allow the service-providing-apparatus authentication information management unit to register user information that includes a user ID, a password, a user attribute, and a public key, in the user information database and to send a message indicating a successful user registration to the client device;

the service-providing-apparatus authentication unit has a service request response function to send to the client device in response to a request for a service, sent from the client device, an authentication request that includes an authentication policy indicating an authentication method of the service, a server certificate, and a signature;

the service-providing-apparatus authentication unit has an authentication processing function to receive an authentication response from the client device, to confirm an authentication method included in the authentication response, and, if the confirmation is successful, to allow the service-providing-apparatus authentication information management unit to identify an entry corresponding to a user ID included in the authentication response and to perform authentication processing corresponding to the confirmed authentication method; and the service providing unit has a service providing function to judge whether the service can be provided and to provide the service if the service can be provided.

8. The service providing apparatus according to claim 7, wherein the authentication policy indicates whether the authentication method of the service is password authentication, public key authentication, or public-key-and-password combination authentication; and in the authentication processing function, verification is performed in the following way as the authentication processing corresponding to the authentication method: if the confirmed authentication method is password authentication, a password is obtained from the entry corresponding to the user ID included in the authentication response and is collated with a password or password authentication information included in the authentication response; if the confirmed authentication method is public key authentication, a public key is obtained from the entry, and the validity of a signature 1 included in the authentication response is confirmed; and if the confirmed authentication method is public-key-and-password combination authentication, a public key is obtained from the entry, and the validity of a signature 2 included in the authentication response is confirmed.

9. The service providing apparatus according to claim 7, further comprising:

an authentication information conversion unit in the micro-processor or CPU that holds an authentication information conversion database storing a user ID, a password, and a public key in association with each user;

wherein the service-providing-apparatus authentication information management unit serves as a component holding the user information database storing a user ID, a password, and a user attribute in association with each user;

in the user registration function, when the service-providing-apparatus authentication unit receives the user information from the client device and verifies the signature, if the verification is successful, the service-providing-apparatus authentication information management unit registers the user ID, the password, and the user attribute, of the user information, in the user information database, and the authentication information conversion unit registers the user ID, the password, and the public key, of the user information, in the authentication information conversion database and sends a message indicating a successful user registration to the client device; and in the authentication processing function, verification is performed in the following way: when the service-providing-apparatus authentication unit receives the authentication response from the client device and confirms the authentication method included in the authentication response and when the confirmation is successful, if the confirmed authentication method is password authentication, a password or password authentication information is obtained from the authentication response; if the confirmed authentication method is public key authentication, the authentication information conversion unit identifies a corresponding user entry by searching the authentication information conversion database in accordance with the user ID included in the authentication response, confirms the validity of a signature 1 included in the authentication response by obtaining a public key, and obtains a password from the entry; and if the confirmed authentication method is public-key-and-password combination authentication, the authentication information conversion unit identifies the corresponding user entry by searching the authentication information conversion database in accordance with the user ID included in the authentication response, obtains the public key and confirms the validity of a signature 2 included in the authentication response, and obtains the password from the entry, and the service-providing-apparatus authentication information management unit identifies a corresponding user entry by searching the user information database in accordance with the user ID included in the authentication response and collates a password of the entry and the password obtained by the authentication information conversion unit.

10. The service providing apparatus according to claim 7, wherein, in the service request response function, the authentication policy sent to the client device indicates a combination of a degree of authentication strength and a level of consent confirmation.

11. The service providing apparatus according to claim 10, wherein, in the user registration function, when the service-providing-apparatus authentication unit receives the user information from the client device and verifies the signature, if the verification is successful, the service-providing-apparatus authentication information management unit registers user information that includes a user policy, the user ID, the password, the user attribute, and the public key, in the user information database, and sends a message indicating a successful user registration to the client device; and in the service request response function, the service-providing-apparatus authentication unit determines, in response to the request for the service sent from the client device, the authentication policy from the user policy and a service policy serving as an authentication policy corresponding to the service, and sends to the client device an authentication request that includes the determined authentication policy, the server certificate, and the signature.

12. A user authentication system comprising:
a client device,
a service providing apparatus, and
a network connecting the client device and the service providing apparatus;
the client device comprising:
a micro-processor or CPU in the client device;
a client authentication information management unit in the micro-processor or CPU in the client device that holds a service information database storing a user ID, a public key, a private key, and a server certificate in association with each service;
a control unit in the micro-processor or CPU in the client device;
a client authentication unit in the micro-processor or CPU in the client device; and a key generation unit in the micro-processor or CPU in the client device;
wherein the control unit has a request function to send a user registration request and a service request to the service providing apparatus;
the client authentication unit has a server authentication function to verify server authentication information and an authentication request sent from the service providing apparatus;
the client authentication unit has a user information transmission function to obtain a signature for a user ID, a password, a user attribute, and a public key generated by the key generation unit, by using a private key generated corresponding to the public key in the key generation unit, and to send to the service providing apparatus user information that includes the user ID, the password, the user attribute, the public key, and the signature;
the client authentication information management unit has a service information registration function to register service information that includes the user ID, the public key, the private key, and a server certificate, in the service information database; and
the client authentication unit has an authentication response function to calculate, if an authentication method identified from an authentication policy included in the authentication request sent from the service providing apparatus is password authentication, password authentication information with which the possession of the password can be confirmed, from the password, and to send an authentication response that includes the password authentication information, the authentication method, and the user ID to the service providing apparatus; to calculate, if the authentication method identified from the authentication policy is public key authentication, a signature 1 for the authentication method, the user ID, and a challenge included in the authentication request, and to send an authentication response that includes the signature 1, the authentication method, and the user ID to the service providing apparatus; and to calculate, if the authentication method identified from the authentication policy is public-key-and-password combination authentication, a signature 2 for the authentication method, the user ID, the challenge included in the authentication request, and the password, and to send an authentication response that includes the signature 2, the authentication method, and the user ID to the service providing apparatus; and
the service providing apparatus comprising:
a micro-processor or CPU in the service providing apparatus;
a service-providing-apparatus authentication information management unit in the micro-processor or CPU in the service providing apparatus that holds a user information database storing a user ID, a password, a user attribute, and a public key in association with each user;
a service providing unit in the micro-processor or CPU in the service providing apparatus; and
a service-providing-apparatus authentication unit in the micro-processor or CPU in the service providing apparatus;
wherein the service-providing-apparatus authentication unit has a registration request response function to send server authentication information that includes a server certificate and a signature to the client device in response to a user registration request sent from the client device;
the service-providing-apparatus authentication unit has a user registration function to receive user information from the client device, to verify a signature, and, if the verification is successful, and to allow the service-providing-apparatus authentication information management unit to register user information that includes a user ID, a password, a user attribute, and a public key, in the user information database and to send a message indicating a successful user registration to the client device;

the service-providing-apparatus authentication unit has a service request response function to send to the client device in response to a request for a service, sent from the client device, an authentication request that includes an authentication policy indicating an authentication method of the service, a server certificate, and a signature;

the service-providing-apparatus authentication unit has an authentication processing function to receive an authentication response from the client device, to confirm an authentication method included in the authentication response, and, if the confirmation is successful, to allow the service-providing-apparatus authentication information management unit to identify an entry corresponding to a user ID included in the authentication response and to perform authentication processing corresponding to the confirmed authentication method; and the service providing unit has a service providing function to judge whether the service can be provided and to provide the service if the service can be provided.

13. A user authentication system comprising:
a key device,
a client device connected to the key device,
a service providing apparatus and
a network connecting the client device and the service providing apparatus;
the key device comprising:
a micro-processor or CPU in the key device;
a client authentication information management unit in the micro-processor or CPU in the key device that holds a service information database storing a user ID, a public key, a private key, and a server certificate in association with each service;
a client authentication unit in the micro-processor or CPU in the key device; and
a key generation unit in the micro-processor or CPU in the key device;
wherein the client authentication unit has a server authentication function to verify server authentication information and an authentication request sent from the service providing apparatus;
the client authentication unit has a user information transmission function to obtain a signature for a user ID, a password, a user attribute, and a public key generated by the key generation unit, by using a private key generated corresponding to the public key in the key generation unit, and to send to the service providing apparatus user information that includes the user ID, the password, the user attribute, the public key, and the signature;
the client authentication unit has an authentication response function to calculate, if an authentication method identified from an authentication policy included in the authentication request sent from the service providing apparatus is password authentication, password authentication information with which the possession of the password can be confirmed, from the password, and to send an authentication response that includes the password authentication information, the authentication method, and the user ID to the service providing apparatus; to calculate, if the authentication method identified from the authentication policy is public key authentication, a signature 1 for the authentication method, the user ID, and a challenge included in the authentication request, and to send an authentication response that includes the signature 1, the authentication method, and the user ID to the service providing apparatus; and to calculate, if the authentication method identified from the authentication policy is public-key-and-password combination authentication, a signature 2 for the authentication method, the user ID, the challenge included in the authentication request, and the password, and to send an authentication response that includes the signature 2, the authentication method, and the user ID to the service providing apparatus; and the client authentication information management unit has a service information registration function to register service information that includes the user ID, the public key, the private key, and a server certificate, in the service information database;

the service providing apparatus comprising:
a micro-processor or CPU in the service providing apparatus;
a service-providing-apparatus authentication information management unit in the micro-processor or CPU in the service providing apparatus that holds a user information database storing a user ID, a password, a user attribute, and a public key in association with each user;
a service providing unit in the micro-processor or CPU in the service providing apparatus; and
a service-providing-apparatus authentication unit in the micro-processor or CPU in the service providing apparatus;
wherein the service-providing-apparatus authentication unit has a registration request response function to send server authentication information that includes a server certificate and a signature to the client device in response to a user registration request sent from the client device;
the service-providing-apparatus authentication unit has a user registration function to receive user information from the client device, to verify a signature, and, if the verification is successful, and to allow the service-providing-apparatus authentication information management unit to register user information that includes a user ID, a password, a user attribute, and a public key, in the user information database and to send a message indicating a successful user registration to the client device;

the service-providing-apparatus authentication unit has a service request response function to send to the client device in response to a request for a service, sent from the client device, an authentication request that includes an authentication policy indicating an authentication method of the service, a server certificate, and a signature;

the service-providing-apparatus authentication unit has an authentication processing function to receive an authentication response from the client device, to confirm an authentication method included in the authentication response, and, if the confirmation is successful, to allow the service-providing-apparatus authentication information management unit to identify an entry corresponding to a user ID included in the authentication response and to perform authentication processing corresponding to the confirmed authentication method; and the service providing unit has a service providing function to judge whether the service can be provided and to provide the service if the service can be provided.

14. A user authentication system according to claim 12,
wherein the client authentication unit stores an authentication method correspondence table that includes an authentication method registered for each authentication policy made up of a combination of a degree of authentication strength and a level of consent confirmation;
in the authentication response function, the client authentication unit reads from the authentication method correspondence table all authentication methods corresponding to the authentication policy included in the authentication request sent from the service providing apparatus, and specifies a user-selected authentication method or an executable authentication method among all the authentication methods as the authentication method identified from the authentication policy; and
in the service request response function, the authentication policy sent to the client device indicates a combination of a degree of authentication strength and a level of consent confirmation.

15. A user authentication system according to claim 13,
wherein the client authentication unit stores an authentication method correspondence table that includes an authentication method registered for each authentication policy made up of a combination of a degree of authentication strength and a level of consent confirmation;
in the authentication response function, the client authentication unit reads from the authentication method correspondence table all authentication methods corresponding to the authentication policy included in the authentication request sent from the service providing apparatus, and specifies a user-selected authentication method or an executable authentication method among all the authentication methods as the authentication method identified from the authentication policy; and
in the service request response function, the authentication policy sent to the client device indicates a combination of a degree of authentication strength and a level of consent confirmation.

16. A user authentication system according to claim 14,
wherein, in the user information transmission function, the client authentication unit obtains a signature for a user policy serving as a user-requested authentication policy, the user ID, the password, the user attribute, and the public key generated by the key generation unit, by using the private key generated corresponding to the public key in the key generation unit, and sends user information that includes the user policy, the user ID, the password, the user attribute, the public key, and the signature to the service providing apparatus;
in the user registration function, when the service-providing-apparatus authentication unit receives the user information from the client device and verifies the signature, if the verification is successful, the service-providing-apparatus authentication information management unit registers user information that includes a user policy, the user ID, the password, the user attribute, and the public key, in the user information database, and sends a message indicating a successful user registration to the client device; and
in the service request response function, the service-providing-apparatus authentication unit determines, in response to the request for the service sent from the client device, the authentication policy from the user policy and a service policy serving as an authentication policy corresponding to the service, and sends to the client device an authentication request that includes the determined authentication policy, the server certificate, and the signature.

17. A user authentication system according to claim 15,
wherein, in the user information transmission function, the client authentication unit obtains a signature for a user policy serving as a user-requested authentication policy, the user ID, the password, the user attribute, and the public key generated by the key generation unit, by using the private key generated corresponding to the public key in the key generation unit, and sends user information that includes the user policy, the user ID, the password, the user attribute, the public key, and the signature to the service providing apparatus;
in the user registration function, when the service-providing-apparatus authentication unit receives the user information from the client device and verifies the signature, if the verification is successful, the service-providing-apparatus authentication information management unit registers user information that includes a user policy, the user ID, the password, the user attribute, and the public key, in the user information database, and sends a message indicating a successful user registration to the client device; and
in the service request response function, the service-providing-apparatus authentication unit determines, in response to the request for the service sent from the client device, the authentication policy from the user policy and a service policy serving as an authentication policy corresponding to the service, and sends to the client device an authentication request that includes the determined authentication policy, the server certificate, and the signature.

18. A user authentication method for authenticating a user with a client device and a service providing apparatus being operated and connected by a network, the user authentication method comprising:
a registration request step in which the client device sends a user registration request to the service providing apparatus;
a registration request response step in which the service providing apparatus sends server authentication information that includes a server certificate and a signature to the client device in response to the user registration request;
an authentication information verification step in which the client device verifies the server authentication information;
a user information transmission step in which the client device obtains a signature for a user ID, a password, a user attribute, and a public key, by using a private key generated corresponding to the public key, and sends user information that includes the user ID, the password, the user attribute, the public key, and the signature, to the service providing apparatus;
a user registration step in which the service providing apparatus verifies the signature in the user information and, if the verification is successful, registers user information that includes the user ID, the password, the user attribute, and the public key and sends a message indicating a successful user registration to the client device;
a service information registration step in which the client device registers service information that includes the user ID, the public key, the private key, and the server certificate, in a service information database;
a service request step in which the client device sends a service request to the service providing apparatus;

a service request response step in which the service providing apparatus sends to the client device in response to a request for a service an authentication request that includes an authentication policy indicating an authentication method of the service, a server certificate, and a signature;

an authentication request verification step in which the client device verifies the authentication request;

an authentication response step in which the client device calculates an authentication response corresponding to the authentication method determined with reference to the authentication policy included in the authentication request and sends the result to the service providing apparatus;

an authentication processing step in which the service providing apparatus confirms the authentication method included in the authentication response and, if the confirmation is successful, performs authentication processing in accordance with the confirmed authentication method; and a service provision step in which the service providing apparatus judges whether the service can be provided and provides the service if the service can be provided.

19. The user authentication method according to claim 18, wherein the authentication policy indicates whether the authentication method of the service is password authentication, public key authentication, or public-key-and-password combination authentication;

in the authentication response step, if the authentication method determined with reference to the authentication policy is password authentication, password authentication information with which the possession of the password can be confirmed is calculated from the password, and an authentication response that includes the password authentication information, the authentication method, and the user ID is sent to the service providing apparatus; if the authentication method determined with reference to the authentication policy is public key authentication, a signature 1 is calculated for the authentication method, the user ID, and a challenge included in the authentication request, and an authentication response that includes the signature 1, the authentication method, and the user ID is sent to the service providing apparatus; and if the authentication method determined with reference to the authentication policy is public-key-and-password authentication, a signature 2 is calculated for the authentication method, the user ID, the challenge included in the authentication request, and the password, and an authentication response that includes the signature 2, the authentication method, and the user ID is sent to the service providing apparatus;

in the authentication processing step performed by the service providing apparatus, verification is performed in the following way as the authentication processing determined by the authentication method: if the confirmed authentication method is password authentication, the password corresponding to the user ID is obtained and collated with the password or password authentication information included in the authentication response; if the confirmed authentication method is public-key authentication, the public key corresponding to the user ID is obtained, and the validity of the signature 1 included in the authentication response is confirmed; and if the confirmed authentication method is public-key-and-password combination authentication, the public key corresponding to the user ID is obtained, and the validity of the signature 2 included in the authentication response is confirmed.

20. The user authentication method according to claim 18, wherein, in the user registration step, the service providing apparatus verifies the signature in the user information and, if the verification is successful, registers the user ID, the password, and the user attribute, of the user information, in a user information database, registers the user ID, the password, and the public key, of the user information, in an authentication information conversion database, and sends a message indicating a successful user registration, to the client device; and in the authentication processing step, the service providing apparatus confirms the authentication method included in the authentication response and when the confirmation is successful, verification is performed in the following way: if the confirmed authentication method is password authentication, a password or password authentication information is obtained from the authentication response; if the confirmed authentication method is public key authentication, the authentication information conversion database is searched in accordance with a user ID included in the authentication response to obtain a public key corresponding to the user ID, the validity of a signature 1 included in the authentication response is confirmed, and a password corresponding to the user ID is obtained; and if the confirmed authentication method is public-key-and-password combination authentication, the authentication information conversion database is searched in accordance with the user ID included in the authentication response to obtain the public key corresponding to the user ID, the validity of a signature 2 included in the authentication response is confirmed, the password corresponding to the user ID is obtained; and the password is collated with the password corresponding to the user ID, obtained by searching the user information database in accordance with the user ID included in the authentication response.

21. The user authentication method according to claim 18, wherein, in the authentication response step, a selected or executable authentication method of authentication methods corresponding to the authentication policy included in the authentication request is specified as the authentication method identified from the authentication policy; and in the service request response step, the authentication policy sent to the client device indicates a combination of a degree of authentication strength and a level of consent confirmation.

22. The user authentication method according to claim 21, wherein, in the user information transmission step, the client device obtains a signature for a user policy serving as a user-requested authentication policy, the user ID, the password, the user attribute, and the public key, by using the private key generated corresponding to the public key, and sends user information that includes the user policy, the user ID, the password, the user attribute, the public key, and the signature to the service providing apparatus.

23. A non-transitory computer-readable recording medium having recorded thereon the program for operating a computer as the device or apparatus according to one of claims 1, 2 and 7.

* * * * *